(12) United States Patent
Hawkett et al.

(10) Patent No.: US 8,779,029 B2
(45) Date of Patent: *Jul. 15, 2014

(54) POLYMER PRODUCT AND INTERFACIAL POLYMERISATION PROCESS USING RAFT AGENT

(75) Inventors: Brian Stanley Hawkett, Mona Vale (AU); Christopher Henry Such, Mount Eliza (AU); Duc Ngoc Nguyen, Wiley Park (AU)

(73) Assignee: The University of Sydney, New South Wales (AU)

( * ) Notice: Subject to any disclaimer, the term of this patent is extended or adjusted under 35 U.S.C. 154(b) by 405 days.

This patent is subject to a terminal disclaimer.

(21) Appl. No.: 12/295,994

(22) PCT Filed: Apr. 3, 2007

(86) PCT No.: PCT/AU2007/000437
§ 371 (c)(1),
(2), (4) Date: Oct. 3, 2008

(87) PCT Pub. No.: WO2007/112503
PCT Pub. Date: Oct. 11, 2007

(65) Prior Publication Data
US 2009/0258979 A1 Oct. 15, 2009

(30) Foreign Application Priority Data

Apr. 3, 2006 (AU) .............................. 2006901730

(51) Int. Cl.
*C08F 2/38* (2006.01)
*C08F 2/10* (2006.01)
(52) U.S. Cl.
USPC ........... 523/200; 523/204; 523/205; 523/207; 428/407; 427/212

(58) Field of Classification Search
USPC ............ 523/207, 200, 204, 205; 526/222, 89, 526/229; 428/407; 427/212
See application file for complete search history.

(56) References Cited

U.S. PATENT DOCUMENTS 6,458,458 B1 * 10/2002 Cooke et al. .................. 428/407
7,064,151 B1 * 6/2006 Berge et al. ................... 521/142
(Continued)

FOREIGN PATENT DOCUMENTS

CA           02341387        2/2001
JP          2004-018557        1/2004
(Continued)

OTHER PUBLICATIONS

J. Loiseau et al., "Synthesis and Characterization of Poly(acrylic acid) Produced by RAFT Polymerization. Application as a Very Efficient Dispersant of $CaCO_3$, Kaolin, and $TiO_2$", Macromolecules, vol. 36, No. 9, Feb. 4, 2003, pp. 3066-3077.

(Continued)

*Primary Examiner* — Satya Sastri
(74) *Attorney, Agent, or Firm* — Arent Fox LLP

(57) ABSTRACT

The invention provides a method of polymerising monomer to form polymer at the surface of solid particulate material, said method comprising: providing a dispersion of said solid particulate material in a continuous hydrophilic liquid phase, said dispersion comprising a hydrophilic RAFT agent as a stabiliser for said solid particulate material, and said continuous hydrophilic liquid phase comprising one or more ethylenically unsaturated monomers; and polymerising said one or more ethylenically unsaturated monomers under the control of said hydrophilic RAFT agent to thereby form polymer at the surface of said solid particulate material.

8 Claims, 1 Drawing Sheet

(56) References Cited

U.S. PATENT DOCUMENTS

| | | | |
|---|---|---|---|
| 7,064,166 B2 * | 6/2006 | Matyjaszewski et al. | 525/168 |
| 7,138,468 B2 * | 11/2006 | McCormick et al. | 526/89 |
| 7,745,553 B2 * | 6/2010 | Such et al. | 526/222 |
| 2003/0199653 A1 | 10/2003 | McCormick, III et al. | |
| 2004/0032038 A1 | 2/2004 | Ali et al. | |
| 2006/0199900 A1 * | 9/2006 | Matsumoto et al. | 524/556 |
| 2008/0268250 A1 * | 10/2008 | Hawkett et al. | 428/407 |

FOREIGN PATENT DOCUMENTS

| | | | |
|---|---|---|---|
| JP | 2004018557 A * | 1/2004 | |
| JP | 2005-272621 | 6/2005 | |
| WO | WO 01/77198 A1 | 10/2001 | |
| WO | WO 0177198 A1 * | 10/2001 | |
| WO | WO 03055919 A1 * | 7/2003 | |
| WO | WO 2005010100 A1 * | 2/2005 | |
| WO | WO 2006/024706 A1 | 3/2006 | |
| WO | WO 2006/037161 A1 | 4/2006 | |

OTHER PUBLICATIONS

El-Aasser, Mohamed S., "Miniemulsions: Overview of Research and Applications", Abstracts of Papers, 224$^{th}$ ACS National Meeting, Boston, MA, United States, Aug. 18-22, 2002.

International Report on Patentability (IPRP) International Patent Application No. PCT/AU05/0001512 (WO 06/037161).

* cited by examiner

POLYMER PRODUCT AND INTERFACIAL POLYMERISATION PROCESS USING RAFT AGENT

CROSS-REFERENCE TO RELATED APPLICATION

This application is a National Stage entry of International Application No. PCT/AU2007/000437, filed Apr. 3, 2007, the entire specification and claims of which are incorporated herewith by reference.

FIELD OF THE INVENTION

The present invention relates to polymer encapsulated solid particulate material, to a method of polymerising monomer to form polymer at the surface of solid particulate material, and to products comprising the polymer encapsulated solid particulate material. The polymer encapsulated solid particulate material is particularly suited for use in coating formulations, and it will therefore be convenient to describe the invention with an emphasis toward this application. However, it is to be understood that the polymer encapsulated solid particulate material may be used in various other applications.

BACKGROUND OF THE INVENTION

Deposition of polymer at the surface of solid particulate materials can afford polymer/particulate material composites that may be used in various applications. For example, polymer may be deposited to coat and encapsulate the particulate material. In this case, the polymer coating could be used to protect the particulate material from an external environment, to effect the controlled release of the particulate material to an external environment, and/or to alter the surface characteristics that the particulate material presents to an external environment. As a case in point, polymer encapsulated pesticide, herbicide or pharmaceutical particulate materials may be used to provide controlled release products. Alternatively, polymer encapsulated pigment particulate material might be used to enhance certain characteristics of paint formulations.

For the efficiency and reliability of products comprising such polymer/solid particulate material composites, it is generally desirable that polymer is deposited at the surface of the particulate material in a relatively controlled, even and reproducible manner. Where the particulate material is encapsulated in and dispersed throughout a bulk polymeric matrix, it will also be generally desirable that the particulate material is uniformly dispersed throughout that matrix.

To date, a common approach to encapsulate solid particulate materials with polymer has involved dispersing the particulate material into a liquid medium comprising a preformed polymer. The liquid medium may be formed by dissolving the polymer in a solvent, or by simply melting the polymer. Alternatively, the particulate material might be dispersed in monomer which is then polymerised to form the polymer. However, the ability to successfully apply such methodologies is often highly polymer and/or particulate material dependent. Furthermore, dispersing agents (i.e. agents with surface activity such as surfactants) often need to be used to facilitate the dispersion of the particulate material in the coating medium. The use of conventional dispersing agents in this manner can be detrimental to the final products in which the polymer/particulate material composites are employed. In particular, conventional dispersing agents are prone to migrate and localise and thereby undesirably alter the wetting characteristics of the product.

A further problem associated with conventional techniques for depositing polymer to coat and encapsulate solid particulate materials is that they typically afford little if no control over being able to reproducibly coat the particulate material with a relatively uniform layer of polymer at a variety of thicknesses.

As an alternative to coating solid particles with preformed polymer, attempts have been made to use conventional free radical polymerisation processes to form polymer at the surface of the particles. However, such attempts have been generally unsuccessful. In particular, processes employing conventional free radical polymerisation techniques to polymerise monomer at the surface of particulate materials are generally not very controllable and have a tendency to produce pimples of, or uneven, polymer at the surface of the particles rather than a uniform polymer coating.

Numerous other methods for depositing polymer at the surface of solid particulate materials have been reported. However, such methods have generally offered little in the way of improved control over the polymer deposition and/or are commercially non-viable.

Accordingly, there remains a need for a commercially viable method for depositing polymer in a controllable manner at the surface of solid particulate materials. Such a method will preferably be robust, efficient and capable of being applied to a range of polymers and particle types and sizes.

SUMMARY OF THE INVENTION

The present invention provides a method of polymerising monomer to form polymer at the surface of solid particulate material, said method comprising:

providing a dispersion of said solid particulate material in a continuous hydrophilic liquid phase, said dispersion comprising a hydrophilic RAFT agent as a stabiliser for said solid particulate material, and said continuous hydrophilic liquid phase comprising one or more ethylenically unsaturated monomers; and polymerising said one or more ethylenically unsaturated monomers under the control of said hydrophilic RAFT agent to thereby form polymer at the surface of said solid particulate material.

Given the similar polarity between the RAFT agent and the continuous liquid phase (i.e. both being hydrophilic), it was expected under these conditions that polymer would more readily be formed in the bulk liquid phase separate from the dispersed particulate material. Surprisingly, it has now been found that a hydrophilic RAFT agent in a hydrophilic liquid phase can control polymerisation of monomers at the surface of dispersed solid particulate material in preference to promoting polymerisation of the monomers in the bulk hydrophilic liquid phase.

In essence, the method of the invention provides a unique interfacial polymerisation technique that enables polymer to be formed at the surface of solid particulate materials in a substantially controllable and reproducible manner. Provided that the solid particulate material can be dispersed in the continuous hydrophilic liquid phase, the particles can be of any shape or size.

Through the control afforded by the method, polymer may be formed at the surface of the solid particulate material in a substantially even fashion and can be provided at tailored thicknesses. Such control advantageously enables the particulate material to be encapsulated by a desired thickness of polymer to provide for a dispersion of polymer encapsulated particulate material in a hydrophilic liquid. Alternatively, where such polymerisation is allowed to continue and sufficient polymer mass is formed, polymer which encapsulates the particulate material may coalesce to provide for a polymer mass having the particulate material dispersed substantially uniformly therethrough.

In one aspect, the present invention provides polymer encapsulated solid particulate material that is 100 microns or less in size, said solid particulate material being encapsulated in a substantially uniform and continuous coating of a polymer which has at least in part been formed under the control of a hydrophilic RAFT agent.

The present invention also provides polymer encapsulated solid particulate material that is 100 microns or less in size, wherein the encapsulating polymer has at least in part been formed under the control of a hydrophilic RAFT agent, and wherein the solid particulate material is substantially uniformly dispersed throughout the encapsulating polymer.

RAFT polymerisation of ethylenically unsaturated monomers is described in WO 98/01478, and in effect is a radical polymerisation technique that enables polymers to be prepared having a well defined molecular architecture and low polydispersity. The technique employs a RAFT agent of the general formula (1):

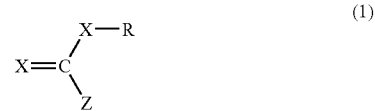

which has been proposed to react with a propagating radical ($P_n^*$) in accordance with Scheme 1.

Scheme 1. Proposed mechanism of RAFT polymerisation

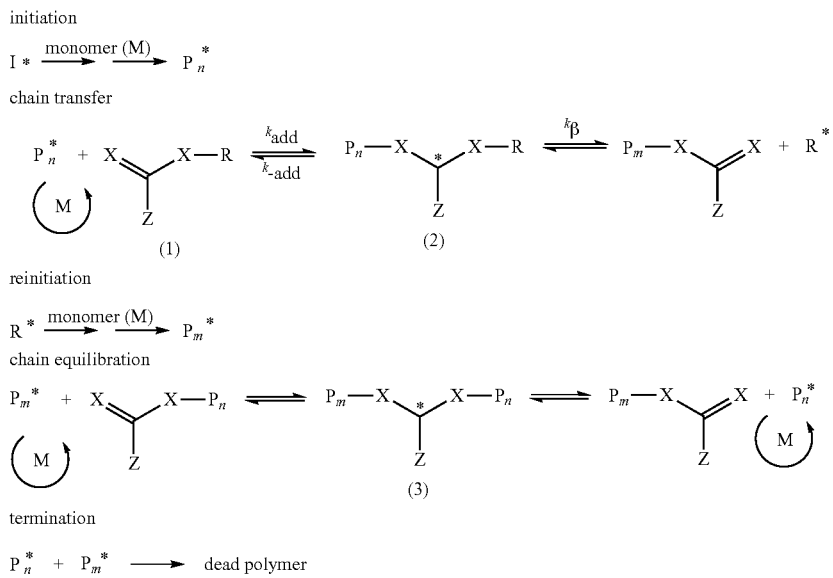

Further aspects of the invention appear below in the detailed description of the invention.

BRIEF DESCRIPTION OF THE DRAWINGS

Preferred embodiments of the invention will now be illustrated by way of Example only with reference to the accompanying drawing in which.

DETAILED DESCRIPTION OF THE INVENTION

Figure 1:
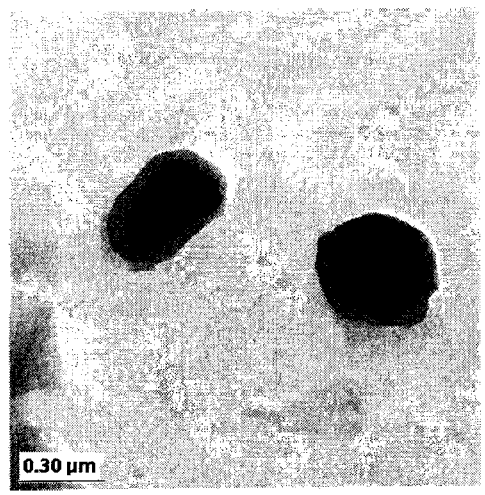
FIG. 1 illustrates polymer encapsulated $TiO_2$ particles prepared in accordance with the invention.

A feature of certain aspects of the invention is that the one or more ethylenically unsaturated monomers are polymerised under the control of the hydrophilic RAFT agent. By being polymerised "under the control" of the hydrophilic RAFT agent is meant that the monomers are polymerised via a Reversible Addition-Fragmentation chain Transfer (RAFT) mechanism to form polymer.

The effectiveness of the RAFT agent (1) is believed to depend on a complex array of rate constants. In particular, the formation of polymer according to scheme 1 is believed to be reliant upon equilibria that require high rate constants for the addition of propagating radicals to agent (1) and the fragmentation of intermediate radicals (2) and (3), relative to the rate constant for propagation.

The rate constants associated with RAFT polymerisation are believed to be influenced by a complex interplay between stability, steric and polarity effects in the substrate, the radicals and the products formed. The polymerisation of specific monomers and combinations of monomers will introduce different factors and structural preferences for the agent (1). The interplay of factors for a particular system have been largely rationalised on the basis of the results obtained. A clear definition of all factors that influence polymerisation for any particular system is yet to be fully understood In accordance with the method of the invention, the solid particulate material is dispersed in a continuous hydrophilic liquid phase, and the resulting dispersion comprises a hydrophilic RAFT agent. Those skilled in the art will appreciate that the terms "hydrophilic" and "hydrophobic" are typically used as an indicator of favourable or unfavourable interactions of one substance relative to another (i.e. attractive or repulsive interactions) and not to define absolute qualities of a particular substance. In other words, the terms "hydrophilic" and "hydrophobic" are used as primary indicators to define characteristics such as like attracting like and unlike repelling unlike.

As a convenient point of reference only, a person skilled in the art might consider a "hydrophilic" substance to have a solubility in water of at least 5 g/L at 25° C., and a "hydrophobic" substance to have a solubility in water of less than 5 g/L at 25° C. In terms of a solid that is insoluble in water, the terms "hydrophilic" and "hydrophobic" might be considered by a person skilled in the art to be a reference to a solid that could be wetted by (i.e. does not repel) a hydrophilic and hydrophobic liquid, respectively.

Thus, in the context of the present invention the "continuous hydrophilic liquid phase" is essentially a continuous liquid phase that is hydrophilic in character. Examples of suitable hydrophilic liquids that may be used as the continuous liquid phase include, but are not limited to, water, water miscible polar solvents such as ethylene and propylene glycol and $C_1$-$C_3$ alcohols, and mixtures thereof. In a preferred embodiment of the invention the continuous hydrophilic liquid phase is a continuous aqueous phase.

Examples of hydrophobic liquids include, but are not limited to, toluene, white spirit and other optionally substituted aromatic or optionally substituted aliphatic liquids.

Similarly, reference herein to a "hydrophilic RAFT agent" is intended to define a RAFT agent having hydrophilic characteristics. In the context of the present invention, such agents will typically not be capable of forming micelles (or aggregates) within the continuous hydrophilic liquid phase. A more detailed discussion on the nature of the hydrophilic RAFT agent is provided below.

In accordance with certain aspects of the invention, the hydrophilic RAFT agent functions as a stabiliser for the dispersed solid particulate material. By functioning as "a stabiliser", the hydrophilic RAFT agent serves to prevent, or at least minimise, coalescence or aggregation of the dispersed solid particulate material. As a stabiliser, the hydrophilic RAFT agent may prevent, or at least minimise, coalescence or aggregation of the solid particulate material through well known pathways such as steric and/or electrostatic repulsion. To provide the ability to function as a stabiliser, the hydrophilic RAFT agent comprises a moiety that can provide for the requisite steric and/or electrostatic repulsion.

In the method of the invention, monomers are polymerised to form polymer at the surface of the solid particulate material. By polymer being formed "at the surface" is meant that polymer forms on or immediately adjacent (i.e. in the direction of the continuous hydrophilic liquid phase) the outermost surface of the particulate material. In other words, polymer forms at the interface between the particulate material and the continuous liquid phase such that it can coat the particulate material. Polymer will generally be formed so as to fully coat or encapsulate the particulate material.

As used herein, the phrase "solid particulate material" is intended to embrace any solid material that is capable of being dispersed throughout the continuous hydrophilic liquid phase. The particulate material will therefore be substantially insoluble in the continuous liquid phase, and in a solid state at the temperature which the method of the invention is performed.

By the particulate material being "dispersed" throughout the liquid continuous phase, it in effect forms a discontinuous phase within the continuous liquid phase. Provided that it can be dispersed throughout the continuous liquid phase, the particulate material may take any shape or size. However, it is recognised that particulate materials having a high aspect ratio, for example those having a flat lamellar or needle shape, may prove more difficult to uniformly coat with polymer than particulate material having a low aspect ratio.

The dispersed solid particulate material may be in the form of primary particles, or in the form of an aggregation of primary particles. The method of the invention has advantageously been found to be particularly effective at forming polymer at the surface of primary particles.

Those skilled in the art will appreciate that as the size of solid particulate materials decrease, the degree of difficulty in being able to deposit polymer in a controllable manner at the surface of the materials increases. The unique interfacial polymerisation afforded by the method of the invention advantageously enables polymer to be formed in a controlled manner with relative ease at the surface of both small and large particles alike, be they primary particles or aggregates thereof.

Accordingly, the solid particulate material may be of any type, shape or size provided that it can be dispersed throughout the continuous hydrophilic liquid phase. Preferably, the largest dimension of the particulate material is no greater than 10 microns, more preferably no greater than 2 microns. The method of the invention has been found to be particularly effective at forming polymer at the surface of sub-micron particles, for example less than 0.5 microns, less than 0.25 microns, less than 0.1 microns, less than 0.01 microns, and even less than 0.005 microns.

Suitable substances from which the solid particulate material may be formed include, but are not limited to, pigments in general, inorganic material such as titanium dioxide, zinc oxide, calcium carbonate, iron oxide, silicon dioxide, barium sulfate, magnetic materials such as γ-iron oxide, and combinations thereof. More hydrophobic organic materials such as waxes, bioactive agents such as pesticides, herbicides, fungicides and pharmaceuticals, and organic pigments such as phthalocyanine blue, pthalocyanine green, quiancridone and dibromananthrone can prove more difficult to disperse with the hydrophilic RAFT agents.

Preferably, the solid particulate material is hydrophilic in character (i.e. can be wetted by a hydrophilic liquid). Examples of such materials include, but are not limited to, titanium dioxide, zinc oxide, calcium carbonate, iron oxide, silicon dioxide, barium sulfate, and magnetic materials such as γ-iron oxide.

It is generally preferred that the solid particulate material that is to be encapsulated by polymer is substantially inert to the reaction conditions under which the RAFT polymerisation process is conducted.

In practical terms, the continuous hydrophilic liquid phase in effect functions as a reaction medium in which the one or more ethylenically unsaturated monomers are polymerised to form polymer at the surface of the solid particulate material. The monomer may be present in the continuous liquid phase as a separate liquid phase, it may be soluble in the continuous liquid phase, or the continuous liquid phase may itself consist or consist essentially of the monomer.

Where the continuous hydrophilic liquid phase does not consist or consist essentially of the one or more ethylenically unsaturated monomers, the method of the invention may be conveniently used to prepare a dispersion of polymer encapsulated solid particles in a hydrophilic liquid. For example, where the continuous liquid phase comprises water and the particulate material is titanium dioxide, the method of the invention may be used to prepare an aqueous dispersion of polymer encapsulated titanium dioxide particles.

The moiety of the hydrophilic RAFT agent that functions to stabilise the solid particulate material in the continuous hydrophilic liquid phase can also advantageously function to stabilise a liquid dispersed polymer encapsulated particulate material formed by the method of the invention. Accordingly, no additional dispersant to disperse the polymer encapsulated particulate material in the liquid is required.

By being "encapsulated" is meant that the polymer substantially surrounds the entire solid particulate material. The polymer may, however, exhibit a degree of porosity (i.e. have some holes or voids in it).

In a preferred embodiment, the invention provides a method of preparing a dispersion of polymer encapsulated solid particulate material in a hydrophilic liquid, said method comprising:

providing a dispersion of solid particulate material in a continuous hydrophilic liquid phase, said dispersion comprising a hydrophilic RAFT agent as a stabiliser for said solid particulate material, and said continuous hydrophilic liquid phase comprising one or more ethylenically unsaturated monomers; and polymerising said one or more ethylenically unsaturated monomers under the control of said hydrophilic RAFT agent to form polymer at the surface of said solid particulate material, thereby providing said dispersion of polymer encapsulated solid particulate material in a hydrophilic liquid.

Preferably, the continuous hydrophilic liquid phase is water and the method produces an aqueous dispersion of polymer encapsulated solid particulate material.

In accordance with this preferred embodiment, the solid particulate material encapsulated by the polymer may be a primary particle or an aggregate thereof. The polymer coating which encapsulates the particles will generally be substantially uniform around the entire particle. Provided the polymer encapsulated particulate material can remain dispersed, encapsulated particles of any size can be prepared using this methodology. The methodology can also be used to prepare the aforementioned polymer encapsulated particulate material that is 100 microns or less in size, wherein the particulate material is encapsulated in a substantially uniform and continuous coating of a polymer. Such novel polymer encapsulated particulate material may be 70 microns or less, 40 microns or less, or 5 microns or less in size. The size of the polymer encapsulated particulate material may also be in the sub-micron range, for example from 0.01 to 1 micron. For the avoidance of any doubt, reference to the "size" of the polymer encapsulated particulate materials in this case is that of the largest dimension provided by the combination of the polymer coating and the solid particulate material.

By the solid particulate material being encapsulated in a "substantially uniform and continuous coating" is meant that the coating does not present in an irregular manner around the particulate material and that the coating is substantially free of holes or voids. To achieve these properties, the thickness of the polymer surrounding the particulate material will generally be relatively constant. However, it may be that the thickness of the encapsulating polymer can vary gradually around the perimeter of the particulate material. For example, the particulate material may not be located at the precise centre of a spherical polymer coating. An assessment of the uniformity and continuity of the coating can generally be made visually, for example by Transmission Electron Microscopy (TEM).

The thickness of the polymer coating which encapsulates the solid particulate material is preferably at least 2 nanometers, more preferably at least 5 nanometers, most preferably at least 10 nanometers, still more preferably at least 20 nanometers. There is no particular limit as to the thickness of polymer that can encapsulate the particulate material, with the ultimate thickness generally being dictated by the intended application for the encapsulated particles.

Where the continuous hydrophilic liquid phase consists or consists essentially of the one or more ethylenically unsaturated monomers, polymerisation of the monomers can result in the continuous liquid phase ultimately forming a polymeric matrix around all of the dispersed solid particles to thereby form a polymer mass having the particles dispersed therethrough. By the particles being initially dispersed in essentially monomer, and the monomer being polymerised at the surface of the dispersed particulate material, the method of the invention can in this case advantageously provide a polymer having the particulate material substantially uniformly dispersed therethrough.

In another preferred embodiment the invention provides a method of preparing a polymer having solid particulate material dispersed therethrough, said method comprising:

providing a dispersion of said solid particulate material in a continuous hydrophilic liquid phase, said dispersion comprising a hydrophilic RAFT agent as a stabiliser for said solid particulate material, and said continuous hydrophilic liquid phase consisting essentially of one or more ethylenically unsaturated monomers; and polymerising said one or more ethylenically unsaturated monomers under the control of said hydrophilic RAFT agent to form polymer at the surface of said solid particulate material, thereby providing polymer having the solid particulate material dispersed therethrough.

By the expression "consisting essentially of" one or more ethylenically unsaturated monomers is meant that that the continuous hydrophilic liquid phase may include additional ingredients, but only if the additional ingredients do not materially alter the basic and novel characteristics of the method. By way of example only, a continuous hydrophilic liquid phase consisting essentially of one or more ethylenically unsaturated monomers might be one which is based on at least 90 weight percent monomer, or at least 95 weight percent monomer. It will be appreciated that in this embodiment of the invention, the one or more ethylenically unsaturated monomers will themselves be hydrophilic.

Where the continuous hydrophilic liquid phase consists essentially of the one or more ethylenically unsaturated monomers, it may be desirable to terminate polymerisation of the monomer prior to it all being converted into polymer. In this case, such a method could provide a dispersion of polymer encapsulated solid particulate material in the remaining non-polymerised one or more ethylenically unsaturated monomers.

As a variation on the method of the invention where the continuous hydrophilic liquid phase consists essentially of the one or more ethylenically unsaturated monomers, it may be desirable to disperse this continuous hydrophilic liquid phase, which itself has the solid particulate material dispersed therethrough, in a further or second continuous liquid phase to provide what might best be described as a double emulsion. For example, the particulate material might be dispersed in a continuous hydrophilic liquid phase which consists essentially of hydrophilic monomer, this continuous hydrophilic liquid phase could then be dispersed in a hydrophobic liquid phase. Thus in this context, the first mentioned continuous liquid phase (i.e. that which consists essentially of monomer) may be considered continuous relative to particulate material dispersed therethrough, and the second mentioned continuous liquid phase may be considered continuous relative to the first continuous liquid phase dispersed therethrough. By performing the method in this manner, the monomer may be polymerised to form a dispersion of polymer particles which advantageously comprise the particulate material substantially uniformly dispersed therethrough. The size of such polymer particles may be conveniently controlled through variation of the droplet size of the dispersed continuous liquid phase comprising the dispersed particulate material using techniques well known in the art.

In the "double emulsion" method mentioned above, the hydrophilic RAFT agent functions as a stabiliser for the solid particulate material to prevent, or at least minimise, coalescence or aggregation of the dispersed particulate material in the continuous hydrophilic liquid phase which consists essentially of monomer. The resulting polymer encapsulated particulate material can therefore be advantageously substantially free of additional dispersant for the particulate material. It will be appreciated by those skilled in the art that a surface active stabiliser will also typically be required to prevent, or at least minimise, coalescence or aggregation of the dispersed aforementioned first continuous liquid phase in the second continuous liquid phase. In this case, it is preferred that the first continuous liquid phase is stabilised in the second continuous liquid phase by a colloid stabiliser. Suitable colloid stabilisers include, but are not limited to, colloids based on poly 12 hydroxy stearic acid, commercial materials such as sorbitan monoleate (Span 80), or polyisobutylene succinic anhydride (PIBSA) based stabilisers.

In accordance with the "double emulsion" method described above, the solid particulate material dispersed throughout the resultant polymer particle may be a primary particle or an aggregate thereof. Advantageously, the particulate material will be substantially uniformly dispersed throughout the polymer particle. Provided the polymer encapsulated particulate material can remain dispersed, encapsulated particles of any size can be prepared using this methodology. The methodology can also be used to prepare the aforementioned polymer encapsulated particulate material that is 100 microns or less in size, wherein the particulate material is dispersed substantially uniformly throughout the polymer. Such novel polymer encapsulated particulate material may be 70 microns or less, 40 microns or less, or 5 microns or less in size. The size of the polymer encapsulated material may also be in the sub-micron range, for example from 0.01 to 1 micron. For the avoidance of any doubt, reference to the size of the polymer encapsulated particulate material in this case is that of the largest dimension provided by the combination the polymer and the solid particulate material dispersed therethrough.

By the hydrophilic RAFT agent facilitating dispersal of the solid particulate material throughout the continuous hydrophilic liquid phase consisting essentially of monomer, and therefore throughout the resulting encapsulating polymer, the polymer encapsulated particulate material can also be formed substantially free of additional dispersant.

By being formed "substantially free of additional dispersant" is meant that the polymer encapsulated solid particulate material comprises less than 30 wt. %, preferably less than 10 wt. %, more preferably less than 5 wt. % of a dispersant, other that the hydrophilic RAFT agent, that is used to disperse the particulate material in the continuous hydrophilic liquid phase, relative to the total amount of dispersant present (i.e. inclusive of the hydrophilic RAFT agent which acts as a stabiliser). In other words, other than the hydrophilic RAFT agent, the encapsulating polymer may comprise substantially no dispersant. Most preferably only the hydrophilic RAFT agent is present as the stabiliser.

By the solid particulate material being dispersed "substantially uniformly" throughout the polymer is meant that the particulate material is not localised or agglomerated within the encapsulating polymer. For example, the particulate material should not be concentrated at the centre or perimeter of the encapsulating polymer An assessment of the dispersed state of the particulate material can generally be made visually, for example by Transmission Electron Microscopy (TEM).

As indicated above, the solid particulate material dispersed in the continuous hydrophilic liquid phase may also be stabilised by other stabilisers such as conventional surfactants or any other surface active agent. Those skilled in the art will appreciate the range of surfactants suitable for this purpose. Nevertheless, to avoid certain disadvantages of using conventional surfactants it is preferred that the particulate material is stabilised only by the hydrophilic RAFT agent. In particular, conventional surfactants are not generally capable of being anchored to the resulting polymer/particle composite and are therefore prone to migrate from their stabilisation site. Products formed using polymer/particle composites that comprise conventional surfactant may therefore be adversely effected as a result of the surfactant migrating and localising in pockets. For example, the water repellency of the product may be compromised.

Hydrophilic RAFT agents used in accordance with the invention not only function as a stabiliser but also play an active role in forming polymer at the surface of the solid particulate material. By virtue of this polymerisation role, the hydrophilic RAFT agent is inherently covalently bound to the polymer that is formed and is therefore prevented from migrating. Where a conventional surfactant is used in the method of the invention, the stabilising function of the hydrophilic RAFT agent effectively reduces the amount of conventional surfactant required and thereby provides a means to at least minimise the negative effects of using such surfactant.

As used herein, the expressions "polymer/particulate material composite" and "polymer/particle composite" are intended to denote a product formed through the deposition of polymer at the surface of solid particulate material.

To function as a stabiliser, the hydrophilic RAFT agent used in accordance with the invention will generally be physically associated in some way with the outermost surface of the solid particulate material. Preferably, the physical association between the hydrophilic RAFT agent and the particulate material will be by way of the hydrophilic RAFT agent being adsorbed onto the outermost surface of the particulate material. By having an ability to be adsorbed onto the outermost surface of the particulate material, it will be appreciated that the hydrophilic RAFT agent will exhibit surface activity, or in other words it will be surface active. An adsorbed hydrophilic RAFT agent can exhibit a degree of lability and is therefore less prone to become enveloped by polymer formed at the surface of the particle. In other words, an adsorbed hydrophilic RAFT agent can have the ability to move freely away from the surface of the particulate material with the polymer that is being formed.

A hydrophilic RAFT agent used in accordance with the invention will typically have a structure that enables it to (a) adsorb onto the outermost surface of the solid particulate material, (b) function as a stabiliser for the solid particulate material, and (c) control polymerisation of the one or more ethylenically unsaturated monomers. Surprisingly, the hydrophilic RAFT agent can be soluble in the continuous hydrophilic liquid phase and still adsorb onto the surface of the particulate material to control polymerisation of the monomers at that surface in preference controlling polymerisation of the monomers in the bulk liquid phase. Further details on the structural characteristics of the hydrophilic RAFT agents are discussed below.

Hydrophilic RAFT agents suitable for use in accordance with the present invention include those of general formula (4):

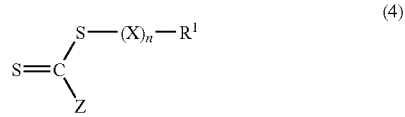

(4)

where each X is independently a polymerised residue of a hydrophilic ethylenically unsaturated monomer, n is an integer ranging from 0 to 100, preferably from 0 to 60, most preferably from 0 to 30, $R^1$ is an organic group optionally substituted with one or more hydrophilic groups and Z is any group that can promote sufficient reactivity of the thiocarbonyl group towards radical addition while not slowing the rate of fragmentation to the extent that there is unacceptable retardation of polymerisation. Preferred $R^1$ groups include $C_1$-$C_6$ alkyl, $C_1$-$C_6$ alkyl aryl, $C_1$-$C_6$ alkoxy aryl or heteroaryl, each of which is optionally substituted with one or more hydrophilic groups selected from —$CO_2H$, —$CO_2R$, —$SO_3H$, —$OSO_3H$, —SOR, —$SO_2R$, —$OP(OH)_2$, —$P(OH)_2$, —PO$(OH)_2$, —OH, —OR, —$(OCH_2$—CHR$)_w$—OH, —$CONH_2$, CONHR', CONR'R", —NR'R", —$N^+R'R"$ R''', where R is selected from $C_1$-$C_6$ alkyl, w is 1 to 10, R', R" and R''' are independently selected from alkyl and aryl which are optionally substituted with one or more hydrophilic substituents selected from —$CO_2H$, —$SO_3H$, —$OSO_3H$, —OH, —(COCH$_2$CHR)$_w$—OH, —$CONH_2$, —SOR and $SO_2R$, and salts thereof, R and w are as defined above. Particularly preferred $R^1$ groups include, but are not limited to, —CH(CH$_3$)CO$_2$H, —CH(CO$_2$H)CH$_2$CO$_2$H, —C(CH$_3$)$_2$CO$_2$H or —CH$_2$(C$_6$H$_5$). Preferred Z groups include, optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy-phosphinyl[—P(=O)OR$^2_2$], dialkyl- or diaryl-phosphinyl [—P(=O)R$^2_2$], optionally substituted acylamino, optionally substituted acylimino, optionally substituted amino, $R^1$—(X)$_n$—S— and a polymer chain formed by any mechanism, for example polyalkylene oxide polymers such as water soluble polyethylene glycol or polypropylene glycol, and alkyl end capped derivatives thereof, where $R^1$, X and n are as defined above and $R^2$ is selected from the group consisting of optionally substituted $C_1$-$C_8$ alkyl, optionally substituted $C_2$-$C_8$ alkenyl, optionally substituted aryl, optionally substituted heterocyclyl, optionally substituted aralkyl, optionally substituted alkaryl. Particularly preferred Z groups include, but are not limited to, —CH$_2$(C$_6$H$_5$), optionally substituted

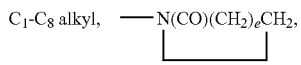

$C_1$-$C_8$ alkyl, —N(CO)(CH$_2$)$_e$CH$_2$, where e is 2 to 4, and —SR$^3$, where R$^3$ is selected from optionally substituted $C_1$ to $C_8$ alkyl.

Preferred optional substituents for $R^2$ and Z groups include epoxy, hydroxy, alkoxy, acyl, acyloxy, carboxy (and salts), sulfonic acid (and salts), alkoxy- or aryloxy-carbonyl, isocyanato, cyano, silyl, halo, and dialkylamino.

In selecting both $R^1$ and Z groups for hydrophilic RAFT agents of formula (4), those agents resulting from any combination of preferred or particularly preferred $R^1$ and Z groups are also particularly preferred.

Where the hydrophilic group is —N$^+$R'R"R''' there will be an associated counter anion.

Other suitable hydrophilic RAFT agents include those of formula (4) in which $R^1$ is an organic group optionally substituted with one or more hydrophobic groups. In this case, Z is preferably an organic group optionally substituted with one or more hydrophilic groups.

It will be appreciated that in selecting $R^1$, —(X)$_n$— and Z groups, the combination thereof must provide an overall hydrophilic character to the RAFT agent of formula (4). Typically, such agents will be incapable of forming micelles in the continuous hydrophilic liquid phase.

In certain aspect of the invention it is preferred that the lower limit for n of formula (4) in the ranges defined above is selected from the integers 1, 2, 3, 4, 5, 6, 7, 8, 9, and 10.

As used herein, the terms "aryl" and "heteroaryl" refer to any substituent which includes or consists of one or more aromatic or heteroaromatic ring respectively, and which is attached via a ring atom. The rings may be mono or polycyclic ring systems, although mono or bicyclic 5 or 6 membered rings are preferred. Examples of suitable rings include but are not limited to benzene, biphenyl, terphenyl, quaterphenyl, naphthalene, tetrahydronaphthalene, 1-benzylnaphthalene, anthracene, dihydroanthracene, benzanthracene, dibenzanthracene, phenanthracene, perylene, pyridine, 4-phenylpyridine, 3-phenylpyridine, thiophene, benzothiophene, naphthothiophene, thianthrene, furan, benzofuran, pyrene, isobenzofuran, chromene, xanthene, phenoxathiin, pyrrole, imidazole, pyrazole, pyrazine, pyrimidine, pyridazine, indole, indolizine, isoindole, purine, quinoline, isoquinoline, phthalazine, quinoxaline, quinazoline, pteridine, carbazole, carboline, phenanthridine, acridine, phenanthroline, phenazine, isothiazole, isooxazole, phenoxazine and the like, each of which may be optionally substituted In this specification "optionally substituted" means that a group is unsubstituted or is substituted with one or more further groups. Where such substituent or further group(s) is not specified, it may be selected from, but is not limited to, alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, acetyleno, carboximidyl, haloaryloxy, isocyano, cyano, formyl, carboxyl, nitro, nitroalkyl, nitroalkenyl, nitroalkynyl, nitroaryl, alkylamino, dialkylamino, alkenylamino, alkynylamino, arylamino, diarylamino, benzylamino, imino, alkylimine, alkenylimine, alkynylimino, arylimino, benzylimino, dibenzylamino, acyl, alkenylacyl, alkynylacyl, arylacyl, acylamino, diacylamino, acyloxy, alkylsulphonyloxy, arylsulphenyloxy, heterocyclyl, heterocycloxy, heterocyclamino, haloheterocyclyl, alkylsulphonyl, arylsulphonyl, alkylsolphinyl, arylsulphinyl, carboalkoxy, alkylthio, benzylthio, acylthio, sulphonamido, sulfanyl, sulfo and phosphorus-containing groups, alkoxysilyl, silyl, alkylsilyl, alkylalkoxysilyl, phenoxysilyl, alkylphenoxysilyl, alkoxyphenoxysilyl, arylphenoxysilyl, allophanyl, guanidino, hydantoyl, ureido, and ureylene.

Unless stated otherwise, the terms "halogen" and "halo" used herein refer to I, Br, Cl and F.

In this specification the term "alkyl", used either alone or in compound words such as "alkenyloxyalkyl", "alkylthio", "alkylamino" and "dialkylamino" denotes straight chain, branched or cyclic alkyl, preferably $C_{1-20}$ alkyl or cycloalkyl. Examples of straight chain and branched alkyl include methyl, ethyl, propyl, isopropyl, butyl, isobutyl, sec-butyl, tert-butyl, amyl, isoamyl, sec-amyl, 1,2-dimethylpropyl, 1,1-dimethyl-propyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methoxyhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethyl-pentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6- or 7-methyl-octyl, 1-, 2-, 3-, 4- or 5-ethylheptyl, 1-, 2- or 3-propylhexyl, decyl, 1-, 2-, 3-, 4-, 5-, 6-, 7- and 8-methylnonyl, 1-, 2-, 3-, 4-, 5- or 6-ethyloctyl, 1-, 2-, 3- or 4-propylheptyl, undecyl, 1-, 2-, 3-, 4-, 5-, 6-, 7-, 8- or 9-methyldecyl, 1-, 2-, 3-, 4-, 5-, 6- or 7-ethylnonyl, 1-, 2-, 3-, 4- or 5-propyloctyl, 1-, 2- or 3-butylheptyl, 1-pentylhexyl, dodecyl, 1-, 2-, 3-, 4-, 5-, 6-, 7-, 8-, 9- or 10-methylundecyl, 1-, 2-, 3-, 4-, 5-, 6-, 7- or 8-ethyldecyl, 1-, 2-, 3-, 4-, 5- or 6-propylnonyl, 1-, 2-, 3- or 4-butyloctyl, 1-2-pentylheptyl and the like. Examples of cyclic alkyl include mono- or polycyclic alkyl groups such as cyclopropyl, cyclobutyl, cyclopentyl, cyclohexyl, cycloheptyl, cyclooctyl, cyclononyl, cyclodecyl and the like.

As used herein, the term "salt" denotes a species in ionised form, and includes both acid addition and base addition salts. In the context of the present invention, suitable salts are those that do not interfere with the RAFT chemistry.

As used herein, the term "counter anion" denotes a species capable of providing a negative charge to balance the charge of the corresponding cation. Examples of counter anions include, $Cl^-$, $I^-$, $Br^-$, $F^-$, $NO_3^-$, $CN^-$ and $PO_3^-$.

As used herein, the term "alkoxy" denotes straight chain or branched alkoxy, preferably $C_{1-20}$ alkoxy. Examples of alkoxy include methoxy, ethoxy, n-propoxy, isopropoxy and the different butoxy isomers.

As used herein, the term "alkenyl" denotes groups formed from straight chain, branched or cyclic alkenes including ethylenically mono-, di- or poly-unsaturated alkyl or cycloalkyl groups as previously defined, preferably $C_{2-20}$ alkenyl. Examples of alkenyl include vinyl, allyl, 1-methylvinyl, butenyl, iso-butenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1-4,pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl and 1,3,5,7-cyclooctatetraenyl.

As used herein, the term "alkynyl" denotes groups formed from straight chain, branched or cyclic alkyne including those structurally similar to the alkyl and cycloalkyl groups as previously defined, preferably $C_{2-20}$ alkynyl. Examples of alkynyl include ethynyl, 2-propynyl and 2- or 3-butynyl.

As used herein, the term "acyl" either alone or in compound words such as "acyloxy", "acylthio", "acylamino" or "diacylamino" denotes carbamoyl, aliphatic acyl group and acyl group containing an aromatic ring, which is referred to as aromatic acyl or a heterocyclic ring which is referred to as heterocyclic acyl, preferably $C_{1-20}$ acyl. Examples of acyl include carbamoyl; straight chain or branched alkanoyl such as formyl, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl; alkoxycarbonyl such as methoxycarbonyl, ethoxycarbonyl, t-butoxycarbonyl, t-pentyloxycarbonyl and heptyloxycarbonyl; cycloalkylcarbonyl such as cyclopropylcarbonyl, cyclobutylcarbonyl, cyclopentylcarbonyl and cyclohexylcarbonyl; alkylsulfonyl such as methylsulfonyl and ethylsulfonyl; alkoxysulfonyl such as methoxysulfonyl and ethoxysulfonyl; aroyl such as benzoyl, toluoyl and naphthoyl; aralkanoyl such as phenylalkanoyl (e.g. phenylacetyl, phenylpropanoyl, phenylbutanoyl, phenylisobutylyl, phenylpentanoyl and phenylhexanoyl) and naphthylalkanoyl (e.g. naphthylacetyl, naphthylpropanoyl and naphthylbutanoyl; aralkenoyl such as phenylalkenoyl (e.g. phenylpropenoyl, phenylbutenoyl, phenylmethacryloyl, phenylpentenoyl and phenylhexenoyl and naphthylalkenoyl (e.g. naphthylpropenoyl, naphthylbutenoyl and naphthylpentenoyl); aralkoxycarbonyl such as phenylalkoxycarbonyl (e.g. benzyloxycarbonyl); aryloxycarbonyl such as phenoxycarbonyl and napthyloxycarbonyl; aryloxyalkanoyl such as phenoxyacetyl and phenoxypropionyl; arylcarbamoyl such as phenylcarbamoyl; arylthiocarbamoyl such as phenylthiocarbamoyl; arylglyoxyloyl such as phenylglyoxyloyl and naphthylglyoxyloyl; arylsulfonyl such as phenylsulfonyl and napthylsulfonyl; heterocycliccarbonyl; heterocyclicalkanoyl such as thienylacetyl, thienylpropanoyl, thienylbutanoyl, thienylpentanoyl, thienylhexanoyl, thiazolylacetyl, thiadiazolylacetyl and tetrazolylacetyl; heterocyclicalkenoyl such as heterocyclicpropenoyl, heterocyclicbutenoyl, heterocyclicpentenoyl and heterocyclichexenoyl; and heterocyclicglyoxyloyl such as thiazolylglyoxyloyl and thienylglyoxyloyl.

As used herein, the terms "heterocyclic", "heterocyclyl" and "heterocycl" used on their own or as part of a term such as "heterocyclicalkenoyl", "heterocycloxy" or "haloheterocyclyl" refer to aromatic, pseudo-aromatic and non-aromatic rings or ring systems which contain one or more heteroatoms selected from N, S, and O and which may be optionally substituted. Preferably the rings or ring systems have 3 to 20 carbon atoms. The rings or ring systems may be selected from those described above in relation to the definition of "heteroaryl".

Most preferred hydrophilic RAFT agents include, but are not limited to, agents represented by the following general formulas 5 to 14:

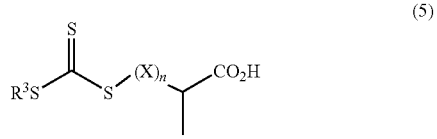

(5)

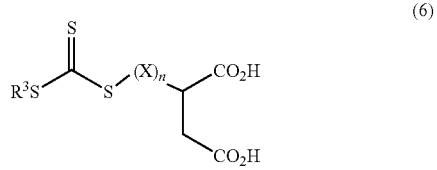

(6)

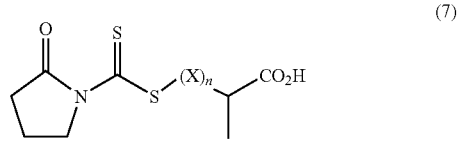

(7)

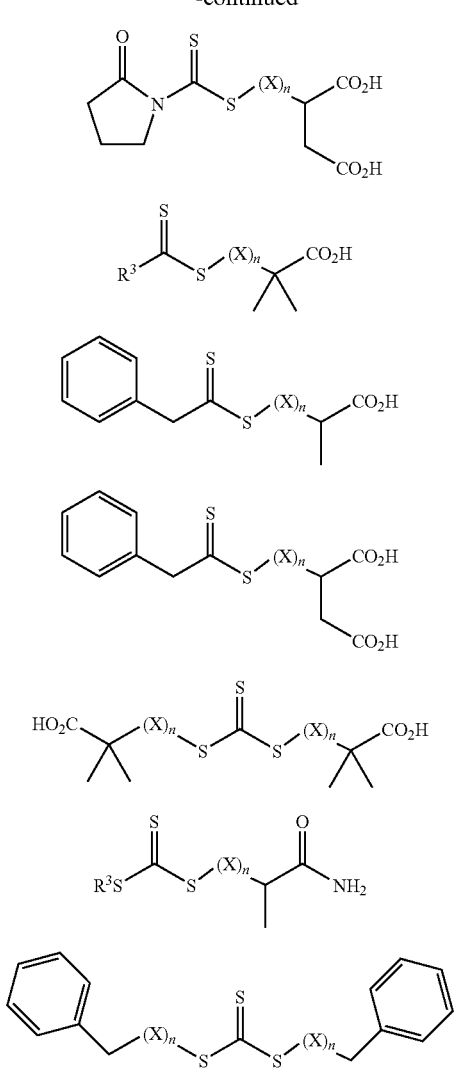

where $R^3$, X and n are as previously defined.

Where a hydrophilic RAFT agent is to be used in accordance with the method of the invention in an aqueous environment (eg. in a continuous aqueous phase), it is preferable that it demonstrates hydrolytic stability. Trithiocarbonyl hydrophilic RAFT agents are particularly preferred for use in such an environment.

The hydrophilic RAFT agents of formula (4) will generally have structural features that enable them to physically associate with the particulate material by a mixture of ionic and non-ionic polar interactions.

Those skilled in the art will appreciate that the hydrophilic character of the RAFT agents used in accordance with the invention can be varied through the selection of different substituents such as $R^1$, Z and —(X)$_n$- in formula (4). Variation in this hydrophilic character can be useful in tailoring desired interactions between the RAFT agent and the continuous hydrophilic liquid phase and the solid particulate material.

A preferred means of tailoring the hydrophilic character of the RAFT agent of formula (4) is by varying the nature of the —(X)$_n$— group. X is independently a polymerised residue of a hydrophilic ethylenically unsaturated monomer. The group —(X)$_n$— may be a homopolymer or a copolymer such as a block or random copolymer. Through variation of the types of hydrophilic monomers used (i.e. types of functional groups, ionizable or non-ionizable, etc), and/or the manner in which they are polymerised (i.e. to form a homopolymer or copolymer), considerable variation in the hydrophilic character of the RAFT agent can be attained. A discussion on the types of hydrophilic monomers that may be used to form the —(X)$_n$— group is provided below.

The selection of a specific hydrophilic RAFT agent for use in accordance with the invention will to a large extent be dictated by the polarity of both the continuous hydrophilic liquid phase and the solid particulate material. For example, the surface active character of a hydrophilic RAFT agent used in association with a hydrophilic particulate material dispersed within a hydrophilic continuous liquid phase is likely to be different from that of a hydrophilic RAFT agent used in association with a hydrophobic particulate material dispersed within a hydrophilic continuous liquid phase.

The selection of a specific hydrophilic RAFT agent for use in accordance with the invention might also be dictated by the combined factors of how efficiently the hydrophilic RAFT agent adsorbs at the surface of the solid particulate material and the amount of polymer that is to be formed at that surface. Maintaining stabilisation of the polymer/particle composite via the hydrophilic RAFT agent can be particularly important where a dispersion of polymer coated particles is being prepared.

In considering a suitable hydrophilic RAFT agent for use in accordance with the invention, the group represented by $R^1$ in formula (4) may be selected such that it is either hydrophilic or hydrophobic in character. However, as previously discussed the $R^1$ group can only be hydrophobic provided it does not prevent the RAFT agent from being overall hydrophilic in character. Preferably, $R^1$ is selected such that it is hydrophilic in character. Due to $R^1$ being somewhat removed from the thiocarbonylthio group, its role in modifying the reactivity of the hydrophilic RAFT agent becomes limited as n increases. However, it is important that the group —(X)$_n$—$R^1$ of formula (4), is a free radical leaving group that is capable of re-initiating polymerisation.

The selection of Z is typically more important with respect to providing the hydrophilic RAFT agent with the ability to gain control over the polymerisation. In selecting a Z group for compounds of formula (4) it is important that such a group does not provide a leaving group that is a better leaving group in comparison with the —(X)$_n$—$R^1$ group of formula (4). By this limitation, monomer insertion preferentially occurs between —(X)$_n$—$R^1$ and its nearest sulfur atom. This will of course not be relevant if the Z group is also an —(X)$_n$—$R^1$ group.

It will be appreciated from the foregoing that a number of variables need to be considered when selecting a hydrophilic RAFT agent for use in accordance with the invention. To further illustrate this point, a number of different approaches to performing the method are described in more detail directly below. In describing the interaction between the hydrophilic continuous liquid phase and the dispersed solid particulate material, it can also be convenient to refer to the polarity or the hydrophilicity/hydrophobicity of such entities.

The method in accordance with the invention may be performed using hydrophilic solid particulate material and a hydrophilic continuous liquid phase. In this case, a hydrophilic RAFT agent of formula (4) may be provided with an —(X)$_n$— group that comprises a proportion of polymerised hydrophilic ionisable monomer. In order to perform the method, the hydrophilic RAFT agent and the solid particulate material are introduced to the continuous liquid phase at a pH which facilitates the formation of an ionic charge at the surface of the particulate material and an opposite ionic charge at the $—(X)_n—$ group of the hydrophilic RAFT agent. In this case, the proportion of polymerised ionisable monomer in the hydrophilic RAFT agent can be sufficient to render the pH of the liquid phase suitable to develop such a charge at the surface of the particulate material and at the $—(X)_n—$ group of the hydrophilic RAFT agent.

Upon formation of the oppositely charged species, the hydrophilic RAFT agent can adsorb at the surface of the solid particulate material such that at least a region of the $—(X)_n—$ group binds to the surface of the particulate material through an ionic mechanism, while other region(s) of the hydrophilic RAFT agent can associate with the continuous liquid phase to stabilise the particulate material from coalescing. Depending upon the degree of ionic bonding that occurs between the hydrophilic RAFT agent and the particulate material, it may be in this case that the hydrophilic RAFT agent will not be free to move away from the surface of the particulate material with the polymer as it is formed. Under these circumstances, it will generally be preferred that the amount of polymer formed at the surface of the particulate material does not envelope the hydrophilic RAFT agent such that it can no longer function as a stabiliser.

Alternatively, to enable a thicker deposit of polymer at the surface of the solid particulate material the hydrophilic character of the hydrophilic RAFT agent may be suitably adjusted to reduce the ionic binding efficiency.

If it is found that the dispersed encapsulated particles become destabilised as the thickness of the polymer coating grows, stabilisation can often be maintained by incorporating an amount of ionisable monomer in the monomer feed. Thus, although an original moiety comprising a stabilising charge becomes buried in the coating and rendered ineffective, the surface charge on the coated particles can be maintained by the later addition of ionisable monomer. Preferably an amount of from 1% to 5% of the ionisable monomer in the monomer feed would be used for this purpose. Suitable ionisable monomers for this include, but are not limited to, acrylic acid, methacrylic acid and sodium styrene sulphonate.

By the term "ionisable", used in connection with ethylenically unsaturated monomers or a group or region of a hydrophilic RAFT agent formed using such monomers, is meant that the monomer, group or region has a functional group which can be ionised to form a cationic or anionic group. Such functional groups will generally be capable of being ionised under acidic or basic conditions through loss or acceptance of a proton. Generally, the ionisable functional groups are acid groups or basic groups. For example, a carboxylic acid functional group may form a carboxylate anion under basic conditions, and an amine functional group may form a quaternary ammonium cation under acidic conditions. The functional groups may also be capable of being ionised through an ion exchange process.

By the term "non-ionisable", used in connection with ethylenically unsaturated monomers or a group or region of a hydrophilic RAFT agent formed using such monomers, is meant that the monomer, group or region does not have ionisable functional groups. In particular, such monomers, groups or regions do not have acid groups or basic groups which can loose or accept a proton under acidic or basic conditions.

Depending upon the nature of the solid particulate material, the continuous hydrophilic liquid phase and the hydrophilic RAFT agent, it may be that prior to the formation of polymer at the surface of the particulate material, a hydrophilic RAFT agent, although acting as a stabiliser, may exhibit a degree of lability. By a hydrophilic RAFT agent exhibiting a degree of "lability" is meant that the agent can exist in an equilibrium between being solvated in the continuous liquid phase and being associated at the surface of the particulate material. For convenience, a hydrophilic RAFT agent that is not associated with the particulate material will hereinafter be referred to as "free" hydrophilic RAFT agent.

The presence of free hydrophilic RAFT agent in the continuous hydrophilic liquid phase can surprisingly result in little or no formation of independent polymer particles (i.e. polymer that is not formed at the surface of the solid particulate material). Without wishing to be limited by theory, this is believed to result from the hydrophilic RAFT agents used in accordance with the invention having little if no tendency to form micelles in the continuous hydrophilic liquid phase. In contrast, RAFT agents that are capable of forming micelles or other aggregates away from the surface of particulate materials will generally have an increased ability to compete effectively for the available monomer that may lead to the formation of independent polymer particles. It will be appreciated that provided a labile hydrophilic RAFT agent gains control of polymerisation at the surface of the particulate material, this polymerisation process itself will inevitably render the agent non-labile.

Where the method of the invention is performed using a continuous hydrophilic liquid phase which does not consist essentially of the one or more ethylenically unsaturated monomers, it is preferred that the one or more monomers are introduced to the continuous liquid phase after the solid particulate material and any hydrophilic RAFT agent interact so as to provide for a stable dispersion. By adopting this approach, the likelihood of any hydrophilic RAFT agent also acting as a stabiliser for monomer droplets in the continuous liquid phase is reduced. It is also preferred that the monomer which is introduced to the continuous liquid phase is done in a manner that avoids the formation of monomer droplets. In other words, it is preferred that the polymerisation is conducted under "starved feed" conditions. Such conditions also reduce the likelihood of stabilised monomer droplets being formed in the continuous liquid phase, which in turn also reduces the possibility of forming polymer that is independent of the particulate material.

Where it is desirable to minimise the possibility of forming polymer that is independent of the particulate material, the polymerisation may be conducted to a point where substantially all labile hydrophilic RAFT agent present has been rendered non-labile. At this point, the "lightly" polymer encapsulated solid particles may be separated from any independent polymer particles that may have formed or any residual free hydrophilic RAFT agent by a separation method such as centrifugation. The "lightly" polymer encapsulated particles could then be redispersed in a continuous hydrophilic liquid phase with monomer and the polymerisation continued to form a thicker polymer coating on the particulate material.

In accordance with the method of the invention, ethylenically unsaturated monomers are polymerised under the control of the hydrophilic RAFT agent to form polymer at the surface of the solid particulate material. The polymerisation will usually require initiation from a source of free radicals. The source of initiating radicals can be provided by any suitable method of generating free radicals, such as the thermally induced homolytic scission of suitable compound(s) (thermal initiators such as peroxides, peroxyesters, or azo compounds), the spontaneous generation from monomers (e.g. styrene), redox initiating systems, photochemical initiating systems or high energy radiation such as electron beam, X— or gamma-radiation. The initiating system is chosen such that under the reaction conditions there is no substantial adverse interaction of the initiator or the initiating radicals with the hydrophilic RAFT agent under the conditions of the reaction.

Thermal initiators are chosen to have an appropriate half life at the temperature of polymerisation. These initiators can include one or more of the following compounds:

2,2'-azobis(isobutyronitrile), 2,2'-azobis(2-cyanobutane), dimethyl 2,2'-azobis(isobutyrate), 4,4'-azobis(4-cyanovaleric acid), 1,1'-azobis(cyclohexanecarbonitrile), 2-(t-butylazo)-2-cyanopropane, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine)dihydrochloride, 2,2'-azobis(2-amidinopropane) dihydrochloride, 2,2'-azobis(N,N'-dimethyleneisobutyramidine), 2,2'-azobis{2-methyl-N-[1,1-bis(hydroxymethyl)-2-hydroxyethyl] propionamide}, 2,2'-azobis {2-methyl-N-[1,1-bis(hydroxymethyl)-2-ethyl]propionamide}, 2,2'-azobis [2-methyl-N-(2-hydroxyethyl)propionamide], 2,2'-azobis(isobutyramide)dihydrate, 2,2'-azobis(2,2,4-trimethylpentane), 2,2'-azobis(2-methylpropane), t-butyl peroxyacetate, t-butyl peroxybenzoate, t-butyl peroxyneodecanoate, t-butylperoxy isobutyrate, t-amyl peroxypivalate, t-butyl peroxypivalate, diisopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, dicumyl hyponitrite. This list is not exhaustive.

Photochemical initiator systems are chosen to have the requisite solubility in the reaction medium and have an appropriate quantum yield for radical production under the conditions of the polymerisation. Examples include benzoin derivatives, benzophenone, acyl phosphine oxides, and photo-redox systems.

Redox initiator systems are chosen to have the requisite solubility in the reaction medium and have an appropriate rate of radical production under the conditions of the polymerisation; these initiating systems can include, but are not limited to, combinations of the following oxidants and reductants:

oxidants: potassium, peroxydisulfate, hydrogen peroxide, t-butyl hydroperoxide.

reductants: iron (II), titanium (III), potassium thiosulfite, potassium bisulfite.

Other suitable initiating systems are described in recent texts. See, for example, Moad and Solomon "the Chemistry of Free Radical Polymerisation", Pergamon, London, 1995, pp 53-95.

Suitable initiators which have an appreciable solubility in a hydrophilic reaction medium such as water include, but are not limited to, 4,4-azobis(cyanovaleric acid), 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N,N'-dimethyleneisobutyramidine), 2,2'-azobis(N,N'-dimethyleneisobutyramidine) dihydrochloride, 2,2'-azobis(2-amidinopropane) dihydrochloride, 2,2'-azobis{2-methyl-N-[1,1-bis(hydroxymethyl)-2-ethyl]propionamide}, 2,2'-azobis[2-methyl-N-(2-hydroxyethyl) propionamide], 2,2'-azobis(isobutyramide) dihydrate, and derivatives thereof.

The continuous hydrophilic liquid phase in a given polymerization process may also contain other additives, for example additives to regulate pH.

In relation to the polymerisation process which occurs during the course of the method of the invention, it is important that polymer is formed at the surface of the solid particulate material and that this polymerisation proceeds under the control of the hydrophilic RAFT agent. Without wishing to be limited by theory, it is believed that the polymerisation process that operates during the method begins through the formation of a propagating monomer radical which diffuses through the continuous hydrophilic liquid phase and positions itself at the surface of the particulate material. As hydrophilic RAFT agents are also positioned at the surface of the particulate material (as stabilisers) they can readily gain control over the polymerisation such that polymerisation of the monomers proceed under a RAFT mediated free radical process. To facilitate this process, it is preferred that the number of hydrophilic RAFT species present at the surface of the particulate material is greater than the sum of initiating radicals that reach that surface throughout the course of the polymerisation reaction.

It is preferable that polymerisation of the monomers is maintained under the control of the hydrophilic RAFT agent throughout the entire polymerisation. However, provided that polymer at the surface of the solid particulate material is at least in part formed under the control of a hydrophilic RAFT agent, monomer may also be polymerised by other free radical pathways. Having said this, it will be appreciated that as the amount of monomer polymerised under the control of the hydrophilic RAFT agent decreases, the propensity for irregular growth and the formation of polymer in one reaction site only increases. The amount of monomer that may be polymerised by other free radical pathways in a given reaction sequence will to a large extent depend upon the intended application for the polymer encapsulated particulate material.

Evidence as to whether a polymerisation reaction in accordance with the method of the invention has proceeded, at least in part, under the control of a hydrophilic RAFT agent may be obtained by a simple visual assessment (for example by Transmission Electron Microscopy) of the polymer coating of the polymer encapsulated solid particulate material. Significant loss of "RAFT control" will be characterised by an irregular non-uniform polymer coating, whereas polymerisation under the control of the hydrophilic RAFT agent provides a regular uniform polymer coating.

Evidence of "RAFT control" may also be readily obtained by sampling the polymer/particulate material composite during the polymerisation reaction and analysing the resulting polymer by a suitable technique such as Gel Permeation Chromatography (GPC). Ideally, where "RAFT control" has been established, the polymer will have a lower polydispersity compared with a polymer prepared by a conventional free radical mediated pathway. The other feature of "RAFT control" shown by GPC data is that molecular weight of the polymer should grow linearly with conversion. This is believed to be an important feature in performing the method of the invention. The polymer formed in accordance with the invention will generally show a linear growth of molecular weight with conversion even though the polydispersity of the polymer may broaden during the course of the polymerisation process.

The composition and architecture of the polymer formed at the surface of the solid particulate material may be tailored through the selection and controlled addition of monomer. A wide range of ethylenically unsaturated monomers may be used in accordance with the method. Suitable monomers are those which can be polymerised by a free radical process. The monomers should also be capable of being polymerised with other monomers. The factors which determine copolymerisability of various monomers are well documented in the art. For example, see: Greenlee, R. Z., in Polymer Handbook 3$^{rd}$ Edition (Brandup, J., and Immergut. E.H. Eds) Wiley: New York, 1989 p II/53. Such monomers include those with the general formula (15):

where U and W are independently selected from the group consisting of —CO$_2$H, —CO$_2$R$^2$, —COR$^2$, —CSR$^2$, —CSOR$^2$, —COSR$^2$, —CONH$_2$, —CONHR$^2$, —CONR$^2{}_2$, hydrogen, halogen and optionally substituted C$_1$-C$_4$ alkyl wherein the substituents are independently selected from the group consisting of hydroxy, —CO$_2$H, —CO$_2$R$^1$, —COR$^2$, —CSR$^2$, —CSOR$^2$, —COSR$^2$, —CN, —CONH$_2$, —CONHR$^2$, —CONR$^2{}_2$, —OR$^2$, —SR$^2$, —O$_2$CR$^2$, —SCOR$^2$, and —OCSR$^2$; and V is selected from the group consisting of hydrogen, R$^2$, —CO$_2$H, —CO$_2$R$^2$, —COR$^2$, —CSR$^2$, —CSOR$^2$, —COSR$^2$, —CONH$_2$, —CONHR$^2$, —CONR$^2{}_2$, —OR$^2$, —SR$^2$, —O$_2$CR$^2$, —SCOR$^2$, and —OCSR$^2$;

where R$^2$ is selected from the group consisting of optionally substituted C$_1$-C$_{18}$ alkyl, optionally substituted C$_2$-C$_{18}$ alkenyl, optionally substituted aryl, optionally substituted heteroaryl, optionally substituted carbocyclyl, optionally substituted heterocyclyl, optionally substituted aralkyl, optionally substituted heteroarylalkyl, optionally substituted alkaryl, optionally substituted alkylheteroaryl and polymer chains wherein the substituents are independently selected from the group consisting of alkyleneoxidyl(epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, amino, including salts and derivatives thereof. Preferred polymer chains include, but are not limited to, polyalkylene oxide, polyarylene ether and polyalkylene ether.

Examples of monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers. As one skilled in the art would recognise, the choice of comonomers is determined by their steric and electronic properties. The factors which determine copolymerisability of various monomers are well documented in the art. For example, see: Greenlee, R Z. in Polymer Handbook 3$^{rd}$ Edition (Brandup, J., and Immergut, E.H Eds.) Wiley: New York. 1989 pII/53.

Specific examples of useful ethylenically unsaturated monomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene and chloroprene. This list is not exhaustive.

In some circumstances, it may be desirable to use hydrophilic ethylenically unsaturated monomers. Suitable monomers of this type include, but are not limited to, acrylic acid, methacrylic acid, hydroxyethyl methacrylate, hydroxypropyl methacrylate, acrylamide and methacrylamide, hydroxyethyl acrylate, N-methylacrylamide or dimethylaminoethyl methacrylate. Other hydrophilic ethylenically unsaturated monomers are listed below.

Those skilled in the art will appreciate that monomers that are selected to form the encapsulating polymer will strongly influence its glass transition temperature (Tg). The "Tg" is a narrow range of temperature over which an amorphous polymer (or the amorphous regions in a partially crystalline polymer) changes from a relatively hard and brittle state to a relatively viscous or rubbery state. The Tg of the encapsulating polymer can conveniently be tailored to suit the intended application for the polymer encapsulated solid particulate material. For example, monomers that are polymerised to form the encapsulating polymer may be selected to provide a Tg that enables an aqueous dispersion of the polymer encapsulated particulate material (as in a paint formulation) to coalesce and form a film.

Tg values referred to herein are calculated, and those relating to a copolymer are calculated in accordance with the Fox equation $(1/Tg=\Sigma_1{}^n W_n/Tg_{(n)})$. Unless otherwise stated, where an encapsulating polymer comprises a mixture of polymers or copolymers having different Tg's, the Tg of the overall polymer composition is calculated as a weighted average value. For example, a polymer mixture comprising a copolymer (50 wt. %) with a calculated Fox Tg of −10° C. and a copolymer (50 wt. %) with a calculated Fox Tg of 50° C., will provide an overall Tg of 20° C.

Those skilled in the art will be capable of selecting monomers to afford an encapsulating polymer with the appropriate Tg for the intended application of the polymer encapsulated particulate material.

To facilitate the formation of polymer at the surface of the solid particulate material, the one or more ethylenically unsaturated monomers are preferably selected such that when they polymerise they form polymer that is substantially insoluble in the continuous hydrophilic liquid phase.

Under certain circumstances, it may be desirable to introduce a degree of crosslinking into the encapsulating polymer. For example, the encapsulating polymer being formed may have a degree solubility in the continuous hydrophilic liquid phase, or the resulting polymer/particulate composite may be used in contact with solvents in which the encapsulating polymer has a degree of solubility. Such a crosslinked polymer structure can be derived by any known means, but it is preferable that it is derived through the use of polymerised ethylenically unsaturated monomers. Those skilled in the art will appreciate that crosslinked polymer structures may be derived in a number of ways through the use of polymerised ethylenically unsaturated monomers. For example, multi-ethylenically unsaturated monomers can afford a crosslinked polymer structure through polymerisation of at least two unsaturated groups to provide a crosslink. In this case, the crosslinked structure is typically derived during polymerisation and provided through a free radical reaction mechanism.

Alternatively, the crosslinked polymer structure may be derived from ethylenically unsaturated monomers which also contain a reactive functional group that is not susceptible to taking part in free radical reactions (i.e. "functionalised" ethylenically unsaturated monomers). In this case, the monomers are incorporated into the polymer backbone through polymerisation of the unsaturated group, and the resulting pendant functional group provides means through which crosslinking may occur. By utilising monomers that provide complementary pairs of reactive functional groups (i.e. groups that will react with each other), the pairs of reactive functional groups can react through non radical reaction mechanisms to provide crosslinks. Formation of such crosslinks will also generally occur during polymerisation of the monomers.

A variation on using complementary pairs of reactive functional groups is where the monomers are provided with non-complementary reactive functional groups. In this case, the functional groups will not react with each other but instead provide sites which can subsequently be reacted with a crosslinking agent to form the crosslinks. It will be appreciated that such crosslinking agents will be used in an amount to react with substantially all of the non-complementary reactive functional groups. Formation of the crosslinks under these circumstances will generally be induced after polymerisation of the monomers.

A combination of these methods of forming a crosslinked polymer structure may also be used.

The terms "multi-ethylenically unsaturated monomers" and "functionalised ethylenically unsaturated monomers" mentioned above can conveniently and collectively also be referred to herein as "crosslinking ethylenically unsaturated monomers" or "crosslinking monomers". By the general expression "crosslinking ethylenically unsaturated monomers" or "crosslinking monomers" is meant an ethylenically unsaturated monomer through which a crosslink is or will be derived. Accordingly, a multi-ethylenically unsaturated monomer will typically afford a crosslink during polymerisation, whereas a functionalised ethylenically unsaturated monomer can provide means through which a crosslink can be derived either during or after polymerisation.

It will be appreciated that not all ethylenically unsaturated monomers that contain a functional group will be used in accordance with the invention for the purpose of functioning as a crosslinking monomer. For example, acrylic acid should not be considered as a crosslinking monomer unless it is used to provide a site through which a crosslink is to be derived.

Examples of suitable multi-ethylenically unsaturated monomers that may be selected to provide the crosslinked polymer structure include, but are not limited to, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, 1,1,1-tris(hydroxymethyl)ethane di(meth)acrylate, 1,1,1-tris(hydroxymethyl)ethane tri(meth)acrylate, 1,1,1-tris(hydroxymethyl)propane di(meth)acrylate, 1,1,1-tris(hydroxymethyl)propane tri(meth)acrylate, triallyl cyanurate, triallyl isocyanurate, triallyl trimellitate, diallyl phthalate, diallyl terephthalte, divinyl benzene, methylol (meth)acrylamide, triallylamine, oleyl maleate, glyceryl propoxy triacrylate, allyl methacrylate, methacrylic anhydride and methylenebis(meth) acrylamide.

Examples of suitable ethylenically unsaturated monomers which contain a reactive functional group that is not susceptible to taking part in free radical reactions include, but are not limited to, acetoacetoxyethyl methacrylate, glycidyl methacrylate, N-methylolacrylamide, (isobutoxymethyl)acrylamide, hydroxyethyl acrylate, t-butyl-carbodiimidoethyl methacrylate, acrylic acid, γ-methacryloxypropyltriisopropoxysilane, 2-isocyanoethyl methacrylate and diacetone acrylamide.

Examples of suitable pairs of monomers mentioned directly above that provide complementary reactive functional groups include N-methylolacrylamide and itself, (isobutoxymethyl)acrylamide and itself, γ-methacryloxypropyltriisopropoxysilane and itself, 2-isocyanoethyl methacrylate and hydroxyethyl acrylate, and t-butyl-carbodiimidoethyl methacrylate and acrylic acid.

Examples of suitable crosslinking agents that can react with the reactive functional groups of one or more of the functionalised ethylenically unsaturated monomers mentioned above include, but are not limited to, amines such as hexamethylene diamine, ammonia, methyl amine, ethyl amine, Jeffamines™ and diethylene triamine, melamine, trimethylolpropane tris(2-methyl-1-aziridine propionate) and adipic bishydrazide. Examples of pairs of crosslinking agents and functionalised ethylenically unsaturated monomers that provide complementary reactive groups include hexamethylene diamine and acetoacetoxyethyl methacrylate, amines such as hexamethylene diamine, ammonia, methyl amine, ethyl amine, Jeffamines™ and diethylene triamine and glycidyl methacrylate, melamine and hydroxyethyl acrylate, trimethylolpropane tris(2-methyl-1-aziridine propionate) and acrylic acid, adipic bishydrazide and diacetone acrylamide.

General techniques used in performing conventional emulsion, mini-emulsion and suspension polymerisations can advantageously be employed in performing the method of the invention. However, when selecting suitable reagents for employing such techniques it should be appreciated that the method of the invention is in effect an interfacial polymerisation process in which polymer is formed at the surface of solid particulate material that is dispersed throughout a continuous hydrophilic liquid phase.

The method of the invention may be operated in batch, semi-continuous or continuous modes. Where the continuous hydrophilic liquid phase consists essentially of the one or more ethylenically unsaturated monomers that are polymerised to form the polymer, the method is preferably operated in batch mode, and where the continuous hydrophilic liquid phase does not consist essentially of the one or more ethylenically unsaturated monomers that are polymerised to form the polymer, the method is preferably operated in semi-continuous or continuous modes.

Semi-continuous and continuous modes of operation offer superior control of polymer architecture together with control over the polymer polydispersity. According to these modes of operation, monomer may be added gradually or in stages thereby enabling different monomers and other additives to be introduced during the course of the polymerisation reaction. As the solid content of the dispersion increases, the resulting polymer/particulate material composite may not be adequately stabilised. In this case, further hydrophilic RAFT agent may be also added to the reaction with the monomer in order to replenish the surface of the particle with stabilising moieties.

By "semi-continuous" is meant that the method is conducted batch wise and monomer is added gradually or in stages throughout the polymerisation. By "continuous" is meant that the method is performed in a loop type reactor whereby all reagents are continuously added gradually or in stages throughout the polymerisation and product is continuously removed from the reaction system. Preferably, the method is performed in a semi-continuous mode.

A preferred method of carrying out a semi-continuous mode of polymerisation comprises adding a selected solid particulate material and hydrophilic RAFT agent to a suitable continuous hydrophilic liquid phase in a reaction vessel to provide for a stable dispersion of the particulate material throughout the continuous liquid phase. A thermal initiator may also be added, along with any other reagents if required, for example buffers to regulate pH. Typically, all reagents used are essentially free from dissolved oxygen and the reaction solution is purged with an inert gas, such as nitrogen, prior to initiating the polymerisation. The dispersion temperature is then increased so that the initiator undergoes thermally induced homolytic scission. Monomer may then be added and polymerisation can proceed under the control of the hydrophilic RAFT agent. The addition of monomer at this stage may be maintained at a rate to avoid reservoir monomer droplets from forming, and can be continued at such a rate until sufficient monomer has been polymerised under the control of the hydrophilic RAFT agent to render it, if it was not already, essentially non-labile from the surface of the solid particulate material. Further monomer, which may be the same or different, can then be added at a greater rate either continually or in stages until the desired degree of polymerisation has occurred. For example, the polymerisation may be continued to provide for a dispersion of polymer/particulate material composite particles having a desired solids content.

A specific example of employing the method of the invention in this manner might be in the coating of titanium dioxide particles with polymer. In this case, the hydrophilic titanium dioxide particulate material could be dispersed in a hydrophilic continuous liquid phase such as water using an appropriate hydrophilic RAFT agent. Upon forming a stable dispersion, hydrophobic monomers such as butyl acrylate and methyl methacrylate may be introduced to the dispersion to form polymer at the surface of the titanium dioxide particles. The polymer may be formed to coat and encapsulate the titanium dioxide particles and further continued to afford a latex having a desired solids content. The resulting latex would therefore comprise an aqueous dispersion of polymer encapsulated titanium dioxide particles which could advantageously be used directly in paint formulations as an opacified binder.

Where the continuous hydrophilic liquid phase used in accordance with the method of the invention consists essentially of the one or more ethylenically unsaturated monomers that are polymerised to form the polymer, the method will typically be performed as a batch process and in effect may be considered as a bulk polymerisation process. Where such a continuous liquid phase is dispersed in a further continuous liquid phase as hereinbefore described, the method may in effect be seen as a miniemulsion or suspension polymerisation process. In these cases, hydrophilic RAFT agent will generally not be introduced to the continuous hydrophilic liquid phase during the course of the polymerisation, and it is therefore preferable that sufficient hydrophilic RAFT agent is used to stabilise the solid particulate material in the continuous hydrophilic liquid phase prior to initiation of the polymerisation reaction.

One approach to performing the method of the invention in bulk mode may involve adding the solid particulate material, the hydrophilic RAFT agent and a thermal initiator to one or more hydrophilic ethylenically unsaturated monomers in a reaction vessel. Other reagents may also be added if required. Typically, all reagents used are essentially free from dissolved oxygen and the reaction solution is purged with an inert gas, such as nitrogen, prior to initiating polymerisation. Having adequately dispersed the solid particulate material throughout the one or more hydrophilic ethylenically unsaturated monomers using means well known to those skilled in the art, the dispersion temperature may then be increased so that the initiator undergoes thermally induced homolytic scission. Given that the continuous hydrophilic liquid phase in this case consists essentially of monomer, a propagating monomer radical is immediately formed. The propagating monomer radical can then diffuse to the surface of the solid particulate material and enable the hydrophilic RAFT agent stabilising the particles to gain control over the polymerisation. The polymerisation continues until substantially all of the monomer has been consumed to thereby provide a polymer matrix having the solid particulate material substantially uniformly dispersed therethrough.

The approach outlined directly above has particular advantages when it is desired to encapsulate high concentrations of nanoparticles within a polymer matrix. Using conventional techniques, the amount of dispersant required to stabilise the nanoparticles in the monomer phase would be expected to radically alter the properties of the matrix polymer even if the dispersant did maintain a stable dispersion during polymerisation of the monomer. Given that the hydrophilic RAFT agent used in accordance with the invention acts as a stabiliser for the particulate material and also takes part in the polymerisation process to ultimately form part of the encapsulating polymer, typical problems associated with the presence of a dispersant in the polymer matrix can advantageously be avoided.

Performing the method in the aforementioned bulk mode could be readily adapted by one skilled in the art such that the continuous hydrophilic liquid phase is dispersed in a further continuous liquid phase to prepare polymer particles having the solid particulate material substantially uniformly dispersed therethrough.

Those skilled in the art will appreciate that numerous parameters may be varied when performing the method of the invention in either continuous, semi-continuous or bulk modes.

There is no particular limitation as to the nature of the continuous hydrophilic liquid phase that may be used in accordance with the method provided that the particulate material may be dispersed in it and that it does not adversely affect the formation of polymer at the surface of the solid particulate material. For convenience, a continuous liquid phase that consists essentially of the one or more ethylenically unsaturated monomers that is polymerised to form the polymer will hereinafter be referred to as a "reactive" continuous hydrophilic liquid phase. Conversely, a continuous liquid phase which does not consist essentially of the one or more ethylenically unsaturated monomers that are polymerised to form the polymer will hereinafter be referred to as a "non-reactive" continuous hydrophilic liquid phase.

Suitable non-reactive continuous hydrophilic liquid phases includes, but are not limited to, water, and water miscible polar solvents such as ethylene and propylene glycol and $C_1$-$C_3$ alcohols.

Suitable monomers that may be used in providing a reactive continuous hydrophilic liquid phase include, but are not limited to, those hydrophilic monomers previously defined.

The method of the invention advantageously provides means to tailor the composition of the polymer that is formed at the surface of the solid particulate material. In particular, the method provides means to polymerise specific or specialised monomers in strategic locations throughout the encapsulating polymer. Such control over the polymerisation can be particularly useful in preparing polymer encapsulated particulate materials that are to be used in coating compositions such as paints.

Features of the invention which relate to the resulting polymer composition that is formed at the surface of the solid particulate material are discussed below with specific reference to an aqueous dispersion of polymer encapsulated pigment particles that are suitable for use as a pigmented binder in waterborne paint formulations. However, it is to be understood that the general principles outlined below may be applied in other applications, such as in fillers, adhesives, primers and sealants, in which a polymer/particulate material composite formed in accordance with the method may be used.

Modification of the encapsulating polymer composition may be achieved by the selective polymerisation of specific or specialised monomers. For example, highly hydrophobic monomers such as 2,2,2-trifluoroethyl methacrylate (TFEM) may be polymerised at a stage during the method to provide a highly hydrophobic surface region of the polymer. Introducing TFEM to a polymer composition in this manner can promote stain resistance to a paint film when such particles are incorporated into a paint formulation. Alternatively, more polar monomers such as acrylamide, dimethyl amino ethyl methacrylate or ureido monomers may be polymerised to provide a highly hydrophilic surface region of the polymer. In this case, the hydrophilic RAFT agent to be used in the polymerisation may also comprise such monomer residues and thereby present a highly hydrophilic polymer surface. Incorporation of such polar monomers at the surface of the polymer composition can assist in their adhesion to difficult surfaces when used in coating applications. In particular, as part of the hydrophilic RAFT agent, the location of these monomers at the surface of the polymer enables their properties as adhesion promoters to be maximised due to their ability to freely interact with a substrate during film formation. Typically, such specific or specialised monomers are polymerised at relatively low levels, preferably at less than 10 wt % of the total monomer content, more preferably less than 5 wt % of the total monomer content, that is polymerised to form polymer at the surface of the solid particulate materials.

The mode of polymerisation which operates in accordance with the method of the invention also enables the internal composition of the polymer formed at the surface of the solid particulate material to be controlled. In particular, the composition of the internal region of the polymer can be varied from that of the surface composition to provide an internal region and an outer shell. In the simplest case, the polymer can be formed whereby a specific monomer is polymerised at one stage of the process and a different monomer is polymerised at a later stage to form a block copolymer. In this way, the solid particulate material may be encapsulated with a hard polymer with a soft film forming exterior, or a soft elastomeric polymer with a hard non-film forming skin. By the terms "hard" and "soft" polymer is meant polymers that are formed from monomers where the homopolymer Tg is above and below room temperature (ie. 25° C.), respectively. Suitable hard monomers include, but are not limited to, methyl methacrylate, t-butyl acrylate and methacrylate, and styrene. Suitable soft monomers include, but are not limited to, esters of acrylic acid such as ethyl, butyl and 2-ethyl hexyl acrylates.

The invention may also be applied in biomedical applications, for example in applications which use biocompatible polymer microparticles containing magnetic nanoparticles. Such microparticles can be delivered intravascularly to perform various medically related functions. These applications range from diagnostic functions such as MRI contrast agents and cell targeting and separation to therapeutic technologies such as magnetic drug targeting and targeted hyperthermia for the treatment of cancer. These technologies rely on certain advantageous magnetic characteristics of the polymer composite microparticles. For example, targeted hyperthermia therapy relies on magnetic characteristics being optimised to generate heat when the microparticles are exposed to a high frequency magnetic field optimised to generate heat.

In view of the delicate nature of such in vivo applications, the need to provide a high level of control over the final microparticle size and the spatial arrangement of the constituent magnetic nanoparticles incorporated within the polymer matrix is very important. In particular, the ability to uniformly distribute a high volume fraction of magnetic nanoparticles into a polymer matrix is highly desirable. The method of the invention has been found to be well suited to preparing polymer microparticles comprising magnetic nanoparticles uniformly distributed therethrough.

The invention also provides a method of preparing a paint, filler, adhesive, toner, liquid ink, primer, sealant, diagnostic product or therapeutic product comprising preparing a dispersion of polymer encapsulated solid particulate material and/or a polymer having solid particulate material dispersed therethrough in accordance with the invention, and combining the dispersion and/or polymer with one or more formulation components.

Those skilled in the art will have an understanding of suitable formulation components that may be included in paints, fillers, adhesives, toner, liquid ink, primers, sealants, diagnostic products or therapeutic products. Examples of such formulation components include, but are not limited to, thickeners, antifungal agents, UV absorbers, extenders, bioactive reagents, and tinting agents.

The invention further provides a paint, filler, adhesive, toner, liquid ink, primer, sealant, diagnostic product or therapeutic product comprising a dispersion of polymer encapsulated solid particles and/or a polymer having solid particulate material dispersed therethrough prepared in accordance with the invention.

Aqueous dispersions of polymer particles are used extensively in waterborne products such as paints, adhesives, fillers, primers, liquid inks and sealants. Such products also typically comprise other formulation components such as pigments, extenders, film forming aids and other additives, all present at different levels and in different combinations. The use of pigments in such products is important not only in providing "hiding" power to the product but also to enable the products to be provided in a variety of colours.

Pigments have traditionally been incorporated in waterborne products by adding the pigments to a preformed aqueous dispersion of polymer particles and dispersing them with the assistance of dispersing agents. Alternatively, pigments are dispersed with the aid of dispersing agents in an initial stage to form what is termed a millbase, and then this millbase is blended with a preformed aqueous dispersion of polymer particles. The dispersion step requires high agitation speeds in order to impart shear on the pigment particles. This dispersion step can sometimes be problematic because conventional aqueous dispersions of polymer particles are not always stable at the levels of shear exerted during pigment dispersion.

In many applications where such pigmented products are used, agglomeration of pigment particles, in the product per se and also during curing of the product, can adversely effect properties such as the products gloss, scrub/stain resistance, flow, mechanical properties, opacity, colour and/or colour strength. Whilst being particularly desirable, reducing or avoiding detrimental agglomeration of pigment particles in such products has to date been difficult to achieve using conventional technology.

It has now been found that polymer encapsulated solid particulate material having at least part of the encapsulating polymer formed under the control of a hydrophilic RAFT agent can present a number of advantageous properties. For example, the polymer encapsulated particulate material can function as a binder and a source of particulate material (e.g. in the form of a pigment—a "pigmented binder") in paint, filler, adhesive, primer, toner, liquid ink or sealant formulations. Providing the particulate material in such an "embedded" form has been found to minimise, if not eliminate, problems such as pigment agglomeration in such products. By forming at least part of the encapsulating polymer under the control of a hydrophilic RAFT agent, the particulate material can also be encapsulated in a substantially uniform and continuous coating of polymer, or dispersed substantially uniformly throughout the encapsulating polymer.

For convenience only, the polymer encapsulated solid particulate material may hereinafter be referred to as a "pigmented binder". However, it is to be understood that the pigment could readily be substituted for any other suitable particulate material.

The present invention therefore further provides a composition comprising or consisting of discrete particles of polymer encapsulated solid particulate material, said solid particulate material being encapsulated in a substantially uniform and continuous coating of a polymer which has at least in part been formed under the control of a hydrophilic RAFT agent.

The present invention also provides a composition comprising or consisting of discrete particles of polymer encapsulated solid particulate material, said discrete particles having the solid particulate material substantially uniformly dispersed throughout the encapsulating polymer, wherein the encapsulating polymer has at least in part been formed under the control of a hydrophilic RAFT agent, and wherein, other than the hydrophilic RAFT agent, the encapsulating polymer comprises substantially no dispersant.

By the encapsulating polymer comprising "substantially no dispersant", it will be appreciated from the foregoing that this is a reference to dispersant other than the hydrophilic RAFT agent. In other words, other than the hydrophilic RAFT agent, the encapsulating polymer contains substantially no dispersant within its polymer matrix.

By "discrete particles" is meant that polymer encapsulated solid particulate material within the composition may be separated into individual particles. However, it will be appreciated that under certain circumstances, for example where the encapsulating polymer has a low Tg, the particles may have a tendency to stick to each other. Nevertheless, the particles should still be discernible as discrete particles.

The composition may be in the form of a flowable powder, a slurry or paste, or in the form of a dispersion. In the case of a flowable powder, slurry or paste, the composition is preferably capable of being diluted with liquid to form a dispersion of the discrete particles. Aqueous dispersions of this type are suitable for use as a pigmented binder in for example water-based paints, fillers, adhesives, primers, liquid inks and sealants.

The compositions of the invention may comprise or consist of pigment particles having a relatively thin (e.g. less than 10 nanometers) encapsulating polymer coating, which may be combined with conventional water based binders to afford paint formulations with a high application solids content. The compositions may also be used as a primary pigmented binder, and even as a sole pigmented binder.

As a "primary" pigmented binder, it is to be understood that the binder will be present in a given formulation in an amount greater than 50 wt %, relative to the total mass of all binder used in that formulation.

In some formulations, it may be desirable to use the pigmented binder in an amount greater than about 60 wt %, more preferably greater than about 80 wt %, most preferably greater than about 95 wt %, still more preferably as the sole pigmented binder (ie 100 wt. %), relative to the total amount of all binder used in that formulation.

At least part of the encapsulating polymer of the polymer encapsulated solid particulate material in the compositions of the invention is formed under the control of a hydrophilic RAFT agent. Such RAFT agents can advantageously function as a stabiliser for the polymer encapsulated particulate material in a liquid dispersion, and/or promote substantially uniform distribution of solid particulate material throughout the encapsulating polymer.

In the form of a liquid dispersion, the composition of polymer encapsulated solid particulate material is particularly suitable for use as a pigmented binder in paint, filler, adhesive, primer, liquid ink or sealant formulations.

Accordingly, the present invention further provides liquid dispersion of polymer encapsulated solid particulate material, said solid particulate material being encapsulated in a substantially uniform and continuous coating of a polymer which has at least in part been formed under the control of a hydrophilic RAFT agent.

In this case, the hydrophilic RAFT agent can advantageously function as a stabiliser for the dispersed polymer encapsulated particulate material. Preferably, the liquid dispersion is hydrophilic such as an aqueous dispersion.

The present invention also provides a liquid dispersion of polymer encapsulated solid particulate material, said polymer encapsulated particulate material having the solid particulate material substantially uniformly dispersed throughout the encapsulating polymer, wherein the encapsulating polymer has at least in part been formed under the control of a hydrophilic RAFT agent, and wherein, other than the hydrophilic RAFT agent, the encapsulating polymer comprises substantially no dispersant.

The present invention further provides a paint, filler, adhesive, primer, liquid ink or sealant formulation comprising a liquid dispersion of polymer encapsulated solid particulate material, said solid particulate material being encapsulated in a substantially uniform and continuous coating of a polymer which has at least in part been formed under the control of a hydrophilic RAFT agent.

The present invention also provides a paint, filler, adhesive, primer, liquid ink or sealant formulation comprising a liquid dispersion of polymer encapsulated solid particulate material having the solid particulate material substantially uniformly dispersed throughout the encapsulating polymer, wherein the encapsulating polymer has at least in part been formed under the control of a hydrophilic RAFT agent, and wherein, other than the hydrophilic RAFT agent, the encapsulating polymer comprises substantially no dispersant.

Preferably, these liquid dispersions are hydrophilic such as an aqueous dispersion.

The method of the invention can be conveniently used to prepare the compositions comprising polymer encapsulated solid particulate material.

The compositions of the invention are suitable for use as a pigmented binder in water-based decorative paint formulations. Decorative paints are those that are typically applied to architectural features and the like, and are most often used in households for application to both interior and exterior surfaces. As used herein, the term "decorative paint(s)" is therefore intended to classify paints that do not need to be subjected to high temperatures after their application to afford a polymeric film having the requisite physical and mechanical properties for their intended application. Accordingly, such paints are to be distinguished from those paints, such as industrial coatings, that require high temperatures to enable the applied paint to form a polymeric film having the requisite physical and mechanical properties.

Paint formulations comprising the compositions of the invention are expected to afford films having improved properties such as improved gloss, gloss retention, opacity, flow, scrub/stain resistance, colour and/or colour strength.

Poor gloss and flow of conventionally pigmented waterborne paints is often associated with the premature flocculation of pigment during film formation. Because both the binder and pigments are present as separate particles, during film formation the pigment particles tend to be crowded into regions between binder particles which in turn restricts their mobility during the film forming process. This crowding effect or aggregation often results in a less uniform distribution of pigment particles within the film and can cause a reduction in gloss properties. In contrast, a pigmented film formed from a binder which is cast from solvent allows the pigment particles to move more freely until much later in the film forming process giving final films with improved gloss and smoother surface appearance.

The compositions comprising or consisting of polymer encapsulated solid particulate material in accordance with the invention can be advantageously be used to prepare waterborne coatings and it is expected that such coatings will provide a surface appearance comparable to their solvent borne counterparts. It is believed that the improved surface properties of such coatings would result from the problem of pigment aggregation during film formation being minimised, if not eliminated.

Paint film gloss is generally measured using instrument readings of reflectivity taken at different angles from the vertical. Gloss readings measured at a 20° angle describe the "depth of gloss" and are often used to characterise low Pigment Volume Concentration (PVC) or gloss paints. Low PVC paints formulated using compositions of polymer encapsulated particulate material in accordance with the invention are expected to provide 20° gloss readings which are superior to those measured for comparative PVC conventional water-based paints. Gloss readings at 60° and 85° of low PVC paints formulated using compositions of the invention are also expected to be generally superior to those measured for comparative PVC conventional water-based paints.

Without wishing to be limited by theory, it is believed that the improved gloss properties of paint films derived from paints in accordance with the invention would be derived from the pigment particles being more uniform in distribution throughout the paint film as a result of being embedded in the encapsulating polymer during film formation.

The properties of opacity and hiding power depend on light absorption, light refractance and light reflectance of particles in a coating film. Only pigment and polymer interfaces are believed to contribute to these properties below the Critical Pigment Volume Concentration (CPVC, i.e. the PVC at which there is just sufficient binder to fill the interstices between all the pigment and extender particles). Paint films derived from paints in accordance with the invention are also expected to demonstrate superior light scattering properties. Thus, higher opacity can advantageously be attained using comparatively less pigment.

Without wishing to be limited by theory, it is believed that the polymer encapsulated solid particulate material would provide a more uniform distribution of pigment throughout the paint film and thereby allow each pigment particle to give a maximum contribution to the total opacity and hiding power of the film.

Flat (or Matt) waterbased paints are usually formulated at high pigment loadings, often above the CPVC. At such high pigment loadings, properties such as opacity tend to be maximised, with added extender particles and air voids contributing to the hiding power of the film. However, properties such as mechanical strength, gloss and stain resistance tend to be adversely affected due to the porosity of the resultant paint films. Paint films derived from paints in accordance with the invention are also expected to exhibit superior gloss, mechanical strength and stain resistance when formulated with a relatively high PVC (eg 72), compared to a conventional waterbased paint formulated to equivalent parameters of PVC, pigment to binder ratio and solids.

Without wishing to be limited by theory, it is believed that such improved properties of paint films derived from paints in accordance with the invention would stem from the paint films being less porous compared to a conventional water-based paint formulated to equivalent parameters of PVC, pigment to binder ratio and solids.

The structural feature of the paint films being less porous is also expected to promote the retention of gloss of the paint film during exterior weathering. Reduction in "glossiness" of paint films after exposure to the elements, is due primarily to the effect of increasing pigment concentration near the film surface as the film binder degrades photocatalytically. Paint gloss typically decreases with increased PVC at the surface. Such reduction in gloss is particularly severe as the PVC passes beyond the CPVC. Poor distribution of pigment in the paint film exacerbates this problem. Gloss retention, as a function of exposure time, can be measured and paint films derived from paints in accordance with the invention are expected to exhibit a superior resistance to gloss loss after considerable exposure time in accelerated weathering experiments (relative to a conventional waterbased paint formulated to equivalent parameters of PVC, pigment to binder ratio and solids), in particular with respect to the depth of gloss visible. It is believed that such an advantageous property will be imparted to paint films derived from paints in accordance with the invention formulated at any PVC.

The compositions of the invention can advantageously comprise or consist of polymer encapsulated solid particulate material where the solid particulate material is a coloured pigment. In the form of an aqueous dispersion, such polymer encapsulated coloured pigment particles are expected to exhibit enhanced colouring characteristics compared with aqueous dispersions of polymer particles in which the coloured pigment particles have been dispersed therethrough in a conventional manner. Compositions comprising or consisting of polymer encapsulated coloured pigment particles can also be employed as tinters for conventional paints, fillers, adhesives, primers, liquid inks, toners, and sealants. In this case, the compositions are likely to be in the form of a free flowing powder, a slurry or paste (i.e a concentrate).

Rub off of coloured pigment from the surface of a dried paint film is a problem frequently encountered in the coatings industry. This phenomenon is generally a result of either flooding or floating of pigment in the system, which occurs during the application of coloured waterborne latex based paints. There are many factors that are known to influence flooding and floating, for example the instability of the pigment and emulsion dispersion and/or the incompatibility of the pigment/pigment paste and the emulsion used. Paint films derived from paints in accordance with the invention that are formulated with the polymer encapsulated coloured pigment particles are expected to exhibit little if no rub off. It is believed that such an advantageous property will be imparted to paint films derived from paints in accordance with the invention formulated at any PVC.

When in the form of a free flowing powder, the compositions in accordance with the invention can advantageously be used in thermofusable powder paint and novel "dry" coating formulations.

The compositions comprising or consisting of polymer encapsulated solid particulate material, wherein the solid particulate material is encapsulated in a substantially uniform and continuous coating of polymer, are particularly suited for use in "dry" coating compositions. Dry coating compositions have been used in the building and construction industry for many years. Such compositions have generally been in the form of a cement compositions comprising polymeric material to which water is added to render the composition ready for use. However, due to the need to maintain optimal pigment dispersion in coating compositions such as paints, conventional dry coating technology has to date been relatively unsuccessful in being applied to coating compositions such as paints. It is expected that liquid may be added to a free flowing powder form of the compositions in accordance with the invention to provide a liquid dispersion of the polymer encapsulated solid particulate material. By being encapsulated in polymer, the solid particulate material is expected to remain well dispersed not only in the liquid dispersion but also as the liquid dispersion cures to form for example a paint film. Accordingly, such free flowing powder compositions may be conveniently referred to as a reconstitutable composition (for example a reconstitutable paint) to which may be added a liquid such as water to render the composition ready for use. Reconsistutable paints of this type may be conveniently packaged, for example in cardboard boxes, and stored for subsequent use.

Compositions in accordance with the invention that may be diluted to form a dispersion through the addition of liquid such as water, may comprise other formulation components known to those skilled in the art. For example, the compositions may comprise a dispersant to facilitate dispersion of the polymer encapsulated solid particulate material within the liquid. However, compositions in accordance with the invention can advantageously be used without the addition of a further dispersant as a result of the hydrophilic RAFT agent used to form at least part of the encapsulating polymer also functioning as a stabiliser for the polymer encapsulated solid particulate material within the liquid. To facilitate dispersion of the polymer encapsulated solid particulate material within the diluting liquid, it may be preferable that the liquid is alkaline. Accordingly, it may be desirable to include in the composition, or the diluting liquid, a base for this purpose. Suitable bases include, but are not limited to, sodium or potassium hydroxide and ammonia (ammonium hydroxide). Other suitable bases would be known to those skilled in the art.

To provide the compositions of the invention in the form of free flowing powder, it is expected that the compositions should generally have a solids content of about 85 wt. % or more, preferably greater than about 90 wt. %.

The free flowing powder compositions may be conveniently prepared using the method of the present invention. In this case, the resulting polymer encapsulated solid particulate material may be isolated using techniques well known in the art. Isolation of the polymer encapsulated particulate material might be by way of filtration, centrifugation and/or freeze-drying. As indicated above, in order to obtain a free flowing powder it will generally not be necessary to remove all liquid (for example water) from the polymer encapsulated particulate material.

The polymer encapsulated solid particulate material used in the free flowing powder compositions will generally comprise encapsulating polymer that is sufficiently hard so that it can withstand the compressive forces encountered as the polymer/particle composite is isolated and dried. By "hard" in this context it is meant that the Tg of the encapsulating polymer is sufficiently high to prevent or at least minimise uncontrollable clumping or aggregation of the composite particles. Generally, the Tg of the encapsulating polymer will be greater than 0° C., more preferably greater than 10° C., more preferably greater than 15° C.

The polymer matrix of the encapsulating polymer of the polymer encapsulated solid particulate material in the compositions of the invention may be conveniently tailored as hereinbefore described. For example, the polymeric matrix of the encapsulating polymer may have a gradient and/or a layered structure as in a core/sheath (shell) type structure. As used herein, the term "core" refers to an internal region or section of the encapsulating polymer, and the term "sheath" or "shell" refer to outer regions or sections of the encapsulating polymer. While the core/sheath terminology may imply that the encapsulating polymer is composed of two separate structural polymeric components it is to be understood that the encapsulating polymer may not have this exact structure and that the distinction between the core and the sheath may not be as precise as suggested by this terminology.

It will be appreciated that where the free flowing powder compositions are to be used as a reconstitutable coating or adhesive product, the Tg of the encapsulating polymer will need to be sufficiently low to enable coalescence of the polymer encapsulated solid particulate material during the film forming or curing process. Generally, the Tg of the encapsulating polymer in this case will be less than about 70° C. Having said this, apart from having a sufficiently high Tg to prevent or at least minimise an undesirable degree of clumping or aggregation of the composite particles, the Tg of the encapsulating polymer will typically be dictated by the intended application of the resulting product.

The present invention also provides a method of preparing a paint, filler, adhesive, liquid ink, primer, sealant, diagnostic product or therapeutic product comprising forming a dispersion of polymer encapsulated solid particulate material by adding a liquid to the compositions in accordance with the invention.

The invention further provides a paint, filler, adhesive, primer, toner, liquid ink, sealant, diagnostic product or therapeutic product comprising a composition in accordance with the invention.

Hydrophilic RAFT agents of formula (4) may be prepared by a number of methods. Preferably they are prepared by polymerising hydrophilic ethylenically unsaturated monomers under the control of a RAFT agent having the following general formula (16):

(16)

where Z and $R^1$ are as previously defined.

In preparing hydrophilic RAFT agents of general formula (4) from RAFT agents of general formula (16) it is important to bear in mind that in performing the method(s) of the invention the agent must also stabilise the solid particulate material in the continuous hydrophilic liquid phase. Compounds of formula (16) may also exhibit some surface activity, however they will generally not be able to stabilise the solid particulate material in the continuous liquid phase. In order to achieve adequate stabilising properties, in the context of compounds of formula (4), compounds of formula (16) are subsequently reacted with appropriate hydrophilic ethylenically unsaturated monomers. Having said this, when n=0 in connection with formula (4), it is to be understood that such a compound inherently possesses sufficient surface activity and can stabilise the solid particulate material in the continuous liquid phase. In this case, formula (4) is equivalent to formula (16), and $R^1$ and Z provide adequate hydrophilic properties in their own right to afford a suitable hydrophilic RAFT agent.

Hydrophilic ethylenically unsaturated monomers suitable for use in preparing compounds of formula (4) can be any monomers that may be polymerised by a free radical process. Examples of suitable hydrophilic ethylenically unsaturated monomers are the same as those hereinbefore described.

The hydrophilic monomers may also be selected for their ionisable or non-ionisable qualities. Examples of suitable ionisable hydrophilic ethylenically unsaturated monomers which have acid groups include, but are not limited to, methacrylic acid, acrylic acid, itaconic acid, p-styrene carboxylic acids, p-styrene sulfonic acids, vinyl sulfonic acid, vinyl phosphonic acid, ethacrylic acid, alpha-chloroacrylic acid, crotonic acid, fumaric acid, citraconic acid, mesaconic acid and maleic acid. Examples of suitable ionisable hydrophilic ethylenically unsaturated monomers which have basic groups include, but are not limited to, 2-(dimethyl amino)ethyl and propyl acrylates and methacrylates, and the corresponding 3-(diethylamino)ethyl and propyl acrylates and methacrylates. Examples of suitable non-ionisable hydrophilic ethylenically unsaturated monomers include, but are not limited to, hydroxy ethyl methacrylate, hydroxy propyl methacrylate, and hydroxy ethyl acrylate.

Polymerisation of hydrophilic ethylenically unsaturated monomer to form compounds of formula (4) are generally conducted in an organic solvent, the choice of which is dictated primarily by the nature of the monomers to be polymerised. Polymerisation may also be conducted in the monomer itself.

Polymerisation of hydrophilic ethylenically unsaturated monomer to form the hydrophilic RAFT agents of formula (4) will usually require initiation from a source of radicals. Initiating systems previously described are also suitable for this purpose.

A method for preparing a hydrophilic RAFT agent of formula (4) might comprise first selecting a suitable RAFT agent. The selected RAFT agent is then combined with a thermal initiator, solvent and hydrophilic monomer within a reaction vessel. Typically all reagents used are essentially free of dissolved oxygen and the reaction solution is purged of any remaining oxygen by way of an inert gas, such as nitrogen, prior to polymerisation. The reaction is subsequently initiated by increasing the temperature of the solution such that thermally induced homolytic scission of the initiator occurs. The polymerisation reaction then proceeds under control of the RAFT agent. Upon exhaustion of the first hydrophilic monomer, one or more further hydrophilic monomers may be sequentially added to the solution immediately, or at a later stage if the intermediate product is isolated, and the polymerisation continued under RAFT control to provide an —$(X)_n$— group Of formula (4) having a block copolymer structure.

Generally, RAFT agents of formula (16) will not in their own right possess sufficient properties to function as stabiliser in accordance with the method of the invention. Accordingly, when preparing a hydrophilic RAFT agent of formula (4), such as by a method described directly above, sufficient hydrophilic monomers are generally polymerised onto the RAFT agent to provide it with the requisite properties. At some point in time during the polymerisation of the hydrophilic monomers, the RAFT agent will develop sufficient surface activity. At this stage in the polymerisation the now surface active hydrophilic RAFT agent may be isolated and/or stored for subsequent use. Alternatively, provided that the medium in which the surface active hydrophilic RAFT agent has been prepared is suitable, solid particulate material can simply be introduced to the reaction medium to thereby be stabilised and provide for a dispersion of the particulate material throughout the continuous hydrophilic liquid phase. Additional monomer may then be introduced to the continuous liquid phase in order to perform the method of the invention.

It will be apparent to those skilled in the art that there are numerous ways in which the method of the invention may be performed by first forming a hydrophilic RAFT agent in the continuous liquid phase (ie. in situ). To further illustrate this aspect, one such approach is described in more detail directly below.

The method of the invention might be used in a process for preparing an aqueous dispersion of polymer encapsulated titanium dioxide particles for use a binder material in paint formulations. This process might involve selecting a hydrophilic solvent soluble RAFT agent of formula (16). The selected RAFT agent may then be combined with a thermal initiator, the solvent and hydrophilic monomer within a reaction vessel. Typically all reagents used will be essentially free of dissolved oxygen and the reaction solution is purged of any remaining oxygen by way of an inert gas, such as nitrogen, prior to polymerisation. The reaction may be initiated by increasing the temperature of the solution such that thermally induced homolytic scission of the initiator occurs. The polymerisation reaction then proceeds under control of the RAFT agent, thereby providing further hydrophilic character to the RAFT agent through insertion of the hydrophilic monomer.

Upon exhaustion of the hydrophilic monomer, one or more other hydrophilic monomers can potentially be sequentially added to the solution and the polymerisation continued under RAFT control to provide hydrophilic RAFT agent of general formula (4). Having attained the desired hydrophilic RAFT agent, water and particulate titanium dioxide may be introduced to the reaction medium whereby the hydrophilic RAFT agent can function to stabilise the particles and provide for a dispersion of the titanium dioxide throughout the continuous aqueous phase.

Having provided a stable dispersion of the titanium dioxide particles throughout the now continuous aqueous phase, hydrophobic monomer such as butyl acrylate and methyl methacrylate may be introduced to the reaction medium to be further polymerised under control of the hydrophilic RAFT agent and thereby form polymer at the surface of the titanium dioxide particles. A small amount of ionisable hydrophilic monomer may be included with the hydrophobic monomers in order to maintain optimum stability during polymerisation. The polymerisation may be continued to provide for a desired solids content, with the resulting aqueous dispersion of polymer encapsulated titanium dioxide particles being suitable for use as an opacified binder material in paint formulations.

As an alternative to the method described directly above, a water soluble RAFT agent of formula (16) might be used to prepare a hydrophilic RAFT agent having a less well defined block-like structure. In this case, rather than homopolymerising or sequentially polymerising the hydrophilic monomers, the hydrophilic monomers may be added simultaneously at a selected ratio to afford a random co-polymer of the —(X)$_n$- component in the hydrophilic RAFT agent of general formula (4). Having formed a hydrophilic RAFT agent with the requisite surface activity, the method may be continued as outlined above.

The effectiveness of a specific compound embraced by formula (16), as a RAFT agent, will depend on its transfer constant, which is determined by the nature of the $R^1$ and Z groups, the hydrophilic monomer and the prevailing reaction conditions. These considerations are discussed above in relation to hydrophilic RAFT agents of formula (4). With respect to the RAFT agents of formula (16), such considerations are essentially the same. In particular, as groups $R^1$ and Z are carried through to the hydrophilic RAFT agent of formula (4), their selection is subject to similar considerations. However, due to closer proximity to the thiocarbonylthio group, the $R^1$ group plays a significant role in the effectiveness of a specific compound as a RAFT agent.

In selecting both $R^1$ and Z groups for RAFT agents of formula (16), those agents resulting from the combination of particularly preferred $R^1$ and Z groups are also particularly preferred.

Most preferred RAFT agents of general formula (16) include, but are not limited to, those agents represented by the following general formulas 17 to 26:

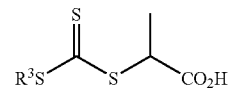
(17)

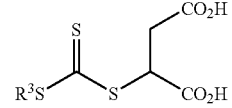
(18)

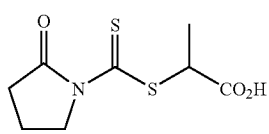
(19)

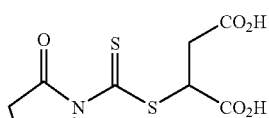
(20)

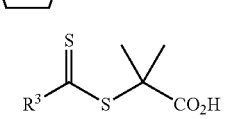
(21)

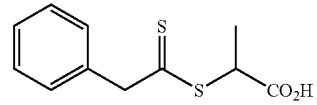
(22)

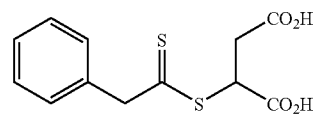
(23)

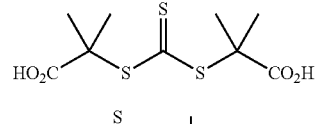
(24)

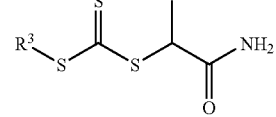
(25)

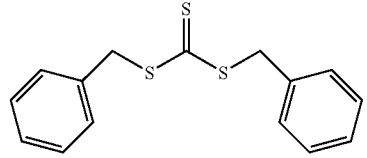
(26)

wherein $R^3$ is as previously defined.

When selecting a RAFT agent of general formula (16) for use in an aqueous environment, it is preferable that it demonstrates hydrolytic stability. Trithiocarbonyl RAFT agents are particularly preferred for use in an aqueous environment.

Where a dithiocarbonyl compound is used as a RAFT agent of general formula (16), it may be a dithioester, a dithiocarbonate, a trithiocarbonate, a dithiocarbamate or the like.

The invention will now be described with reference to the following examples which illustrate some preferred embodiments of the invention. However, it is to be understood that the particularity of the following description is not to supersede the generality of the preceding description of the invention.

EXAMPLES

Example I a) Preparation of a poly(acrylic acid)$_m$-block-poly(acrylamide)$_n$ macro-RAFT agent with respective degrees of polymerization m≈5, n≈30 using 2-{[(butylsulfanyl)carbonothioyl]sulfanyl}propanoic acid A solution of 2-{[(butylsulfanyl)carbonothioyl]sulfanyl}propanoic acid (1.32 g, 5.5 mmol), 4,4'-azobis(4-cyanovaleric acid) (0.08 g, 0.3 mmol), acrylamide (12.12 g, 170.5 mmol) in dioxane (17.9 g) and water (15.5 g) was prepared in a 100 mL round bottom flask. This was stirred magnetically and sparged with nitrogen for 15 minutes. The flask was then heated at 70° C. for 4 hrs. At the end of this period, acrylic acid (2.04 g, 28.3 mmol) and 4,4'-azobis(4-cyanovaleric acid) (0.07 g, 0.3 mmol) was added to the flask. The mixture was deoxygenated and heating was continued at 70° C. for a further 3 hrs. The copolymer solution had 44.5% solids.

b) Poly(methyl methacrylate-co-butyl acrylate) coating of TiO$_2$ pigment (Tranox CR828 (Kerr-McGee pigments)) using macro RAFT from Example I, a) as a stabilizer A solution containing macro RAFT from a) (2.49 g, 0.3 mmol), water (50.2 g) was prepared in a 100 ml beaker. The pH of the solution was raised to 5.13 by an addition of concentrated ammonia (28%). To this macro RAFT solution, TiO$_2$ pigment (9.98 g) was added, mixed and was further thoroughly dispersed using a Vibra-Cell Ultrasonic Processor (Sonics and Materials, Inc.) standard probe at 30% amplitude for 5 minutes. During the sonication process, the dispersion was stirred magnetically and cooled in a water bath. The white dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.39 g, 10.9 mmol), methyl methacrylate (3.25 g, 32.4 mmol) was fed into the flask at 0.93 g/hr over 5 hrs. After monomer addition was complete, the heating was continued for another 1 hr after which time polymerization was found to be complete. After filtering, the latex was white and stable, containing particles about 456 nm in diameter (HPPS, Malvern Instruments Ltd). The latex had solids of 23.3% and formed a white and glossy film after drying. Transmission electron microscopy showed that the latex contained polymer encapsulated TiO$_2$ particles.

c) Poly(methyl methacrylate-co-butyl acrylate-co-methacrylic acid) coating of TiO$_2$ pigment (CR828) using macro RAFT from Example I, a) as a stabilizer A solution containing macro RAFT from a) (2.50 g, 0.3 mmol), water (50.6 g) was prepared in a 100 ml beaker. The pH of the solution was raised to 5.27 by an addition of concentrated ammonia (28%). To this macro RAFT solution, TiO$_2$ pigment (10.16 g) was added, mixed and was further thoroughly dispersed using a Vibra-Cell Ultrasonic Processor (Sonics and Materials, Inc.) standard probe at 30% amplitude for 5 minutes. During the sonication process, the dispersion was stirred magnetically and cooled in a water bath. The white dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.27 g, 9.9 mmol), methyl methacrylate (2.97 g, 29.7 mmol) and methacrylic acid (0.42 g, 4.9 mmol) was fed into the flask at 0.93 g/hr over 5 hrs. After monomer addition was complete, the heating was continued for another 12 hrs after which time polymerization was found to be complete. The latex was white and stable, containing particles about 455 nm in diameter (HPPS, Malvern Instruments Ltd). The latex had solids of 23.5% and formed a white and glossy film after drying. Transmission electron microscopy showed that the latex contained polymer encapsulated TiO$_2$ particles. The encapsulating polymer layer around TiO$_2$ the particles was further increased by adding another deoxygenated mixture of butyl acrylate (1.27 g, 9.9 mmol), methyl methacrylate (2.97 g, 29.7 mmol) and methacrylic acid (0.42 g, 4.9 mmol) at 2.3 g/hr into the above latex (54.15 g) in the presence of 2,2'-azobis(2-methylpropionamidine)dihydrochloride (0.03 g, 0.1 mmol) at 70° C. over 2 hrs. After monomer addition was complete the temperature was maintained for a further 5 hours to effect full polymerisation. Examination by transmission electron microscopy showed polymer encapsulated TiO$_2$ particles (FIG. 1). An average particle diameter of 491 nm was determined by dynamic laser light scattering (HPPS, Malvern Instruments Ltd). Latex solids was 29.4%.

Example II

Poly(methyl methacrylate-co-butyl acrylate-co-methacrylic acid) coating of Bayferrox Red 110 M iron oxide pigment (Bayer) using macro RAFT from Example 1 a) as a stabilizer A solution containing macro RAFT from Example I, a) (3.04 g, 0.3 mmol), water (51.3 g) was prepared in a 100 ml beaker. The pH of the solution was raised to 6.67 by an addition of concentrated ammonia (28%). To this macro RAFT solution, red iron oxide pigment (5.00 g) was added, mixed and was further thoroughly dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The red dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.27 g, 9.9 mmol), methyl methacrylate (2.97 g, 29.7 mmol) and methacrylic acid (0.42 g, 4.9 mmol) was fed into the flask at 0.93 g/hr over 5 hrs. After monomer addition was complete, the heating was continued for another 12 hrs after which time polymerization was found to be complete. The latex was stable, containing particles about 909 nm in diameter (HPPS, Malvern Instruments Ltd). The latex had solids of 17.3% and formed a red brown glossy film after drying. Transmission electron microscopy showed that the latex contained polymer encapsulated pigment particles.

Example III a) Preparation of a poly(acrylic acid) macro-RAFT agent containing an average of 15 monomer units per chain 2-{[(butylsulfanyl)carbonothioyl]sulfanyl}propanoic acid A solution of 2-{[(butylsulfanyl)carbonothioyl]sulfanyl}propanoic acid (0.91 g, 3.8 mmol), 2,2'-azobisisobutyronitrile (0.03 g, 0.2 mmol), acrylic acid (4.14 g, 57.4 mmol) in dioxane (10.01 g) was prepared in a 50 µL round bottom flask. This was stirred magnetically and sparged with nitrogen for 10 minutes. The flask was then heated at 70° C. for 2 hrs under constant stirring. The final copolymer solution had 43.1% solids.

b) Poly(methyl methacrylate-co-butyl acrylate-co-acrylic acid) coating of $TiO_2$ pigment (TR92, Huntsman Corporation) using macro RAFT from Example III, a) as a stabilizer A solution containing macro RAFT from Example III, a) (1.05 g, 0.3 mmol), water (54.34 g) was prepared in a 100 ml beaker. To this solution, $TiO_2$ pigment (11.65 g) was added, mixed and was further thoroughly dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The white dispersion (67.05 g) was transferred to a 100 ml round bottomed flask containing 4,4'-azobis(4-cyanovaleric acid) (0.027 g, 0.1 mmol) and was deoxygenated by nitrogen sparging. The whole flask was immersed in an oil bath with a temperature setting of 70° C., while a deoxygenated mixture of butyl acrylate (0.30 g, 2.3 mmol), methyl methacrylate (0.67 g, 6.9 mmol) and acrylic acid (0.98 g, 13.7 mmol) was fed into the flask at 1 g/hr over 2 hrs. After monomer addition was complete, the heating was continued for another 14 hrs after which time polymerization was found to be complete. After filtering, the latex was white and stable, containing particles about 478 nm in diameter (HPPS, Malvern Instruments Ltd) Latex solids was 21.5%. Transmission electron microscopy showed that the latex contained polymer encapsulated $TiO_2$ particles.

Example IV a) Preparation of a poly {(acrylic acid)$_m$-co-(acrylamide)$_n$} macro-RAFT agent with respective degrees of polymerization m≈5, n≈30 using 2-{[(butylsulfanyl)carbonothioyl]sulfanyl}propanoic acid A solution of 2-{[(butylsulfanyl)carbonothioyl]sulfanyl}propanoic acid (1.32 g, 5.5 mmol), 4,4'-azobis(4-cyanovaleric acid) (0.08 g, 0.3 mmol), acrylamide (12.16 g, 171 mmol), acrylic acid (1.99 g, 27.6 mmol) in dioxane (16.7 g) and water (15.5 g) was prepared in a 100 mL round bottom flask. This was stirred magnetically and sparged with nitrogen for 15 minutes. The flask was then heated at 70° C. for 4 hrs. The copolymer solution had 41.7% solids.

b) Poly(methyl methacrylate-co-butyl acrylate-co-methacrylic acid) coating of $TiO_2$ pigment (TR92, Huntsman Corporation) using macro RAFT from Example IV, a) as a stabilizer A solution containing macro RAFT from Example IV, a) (2.54 g, 0.3 mmol), water (51.8 g) was prepared in a 100 ml beaker. The pH of the solution was raised to 5.03 by an addition of concentrated ammonia (28%). To this macro RAFT solution, $TiO_2$ pigment (10.21 g) was added, mixed and was further thoroughly dispersed using a Vibra-Cell Ultrasonic Processor (Sonics and Materials, Inc.) standard probe at 30% amplitude for 5 minutes. During the sonication process, the dispersion was stirred magnetically and cooled in a water bath. The white dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.27 g, 9.9 mmol), methyl methacrylate (2.97 g, 29.7 mmol) and methacrylic acid (0.42 g, 4.9 mmol) was fed into the flask at 0.93 g/hr over 5 hrs. After monomer addition was complete, the heating was continued for another 1 hr after which time polymerization was found to be complete. The final latex was white and stable, containing particles about 364 nm in diameter (HPPS, Malvern Instruments Ltd). The latex had solids of 23.3% and formed a white and glossy film after drying. Transmission electron microscopy showed that the latex contained polymer encapsulated $TiO_2$ particles.

Example V a) Preparation of a poly(acrylic acid)$_m$-block-poly{(styrene sulfonic acid)$_n$-co-(acrylamide)$_t$} macro-RAFT agent with respective degrees of polymerization m≈5, n≈5 and t≈30 using 2-{[(butylsulfanyl)carbonothioyl]sulfanyl}propanoic acid A solution of 2-{[(butylsulfanyl)carbonothioyl]sulfanyl}propanoic acid (0.96 g, 4.0 mmol), 4,4'-azobis(4-cyanovaleric acid) (0.08 g, 0.3 mmol), acrylamide (8.86 g, 124.6 mmol) and styrene sulfonic acid (neutralized with sodium hydroxy, 4.18 g, 20.3 mmol) in dioxane (15.8 g) and water (15.4 g) was prepared in a 100 mL round bottom flask. This was stirred magnetically and sparged with nitrogen for 15 minutes. The flask was then heated at 70° C. for 4 hrs. At the end of this period, acrylic acid (1.46 g, 20.2 mmol) and 4,4'-azobis(4-cyanovaleric acid) (0.04 g, 0.1 mmol) was added to the flask. The mixture was deoxygenated and heating was continued at 70° C. for a further 3 hrs. The copolymer solution had 39.0% solids.

b) Poly(methyl methacrylate-co-butyl acrylate-co-methacrylic acid) coating of $TiO_2$ pigment (TR92, Huntsman Corporation) using macro RAFT from Example V, a) as a stabilizer A solution containing macro RAFT from Example V, a) (3.33 g, 0.3 mmol), water (50.9 g) was prepared in a 100 ml beaker. The pH of the solution was raised to 5.08 by an addition of concentrated ammonia (28%). To this macro RAFT solution, $TiO_2$ pigment (10.47 g) was added, mixed and was further thoroughly dispersed using a Vibra-Cell Ultrasonic Processor (Sonics and Materials, Inc.) standard probe at 30% amplitude for 10 minutes. During the sonication process, the dispersion was stirred magnetically and cooled in a water bath. The white dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.27 g, 9.9 mmol), methyl methacrylate (2.97 g, 29.7 mmol) and methacrylic acid (0.42 g, 4.9 mmol) was fed into the flask at 0.93 g/hr over 5 hrs. After monomer addition was complete, the heating was continued for another 17 hrs after which time polymerization was found to be complete. The final latex was white and stable, containing particles about 298 nm in diameter (HPPS, Malvern Instruments Ltd). The latex had solids of 24.2% and formed a white and glossy film after drying. Transmission electron microscopy showed that the latex contained polymer encapsulated TiO$_2$ particles.

Example VI a) Preparation of a poly {(acrylic acid)$_m$-co-(styrene sulfonic acid)$_n$} macro-RAFT agent with respective degrees of polymerization m≈10, n≈5 using 2-{[(butylsulfanyl)carbonothioyl]sulfanyl}propanoic acid A solution of 2-{[(butylsulfanyl)carbonothioyl]sulfanyl}propanoic acid (1.20 g, 5.0 mmol), 4,4'-azobis(4-cyanovaleric acid) (0.08 g, 0.3 mmol), styrene sulfonic acid (neutralized with sodium hydroxy, 5.50 g, 26.7 mmol), acrylic acid (3.69 g, 51.2 mmol) in dioxane (11.13 g) and water (11.44 g) was prepared in a 100 mL round bottom flask. This was stirred magnetically and sparged with nitrogen for 15 minutes. The flask was then heated at 70° C. for 4 hrs. The copolymer solution had 31.5% solids.

b) Poly(methyl methacrylate-co-butyl acrylate-co-methacrylic acid) coating of TiO$_2$ pigment (TR92, Huntsman Corporation) using macro RAFT from Example VI, a) as a stabilizer A solution containing macro RAFT from Example VI, a) (1.84 g, 0.3 mmol), water (51.9 g) was prepared in a 100 ml beaker. The pH of the solution was raised to 3.76 by an addition of concentrated ammonia (28%). To this macro RAFT solution, TiO$_2$ pigment (10.07 g) was added, mixed and was further thoroughly dispersed using a Vibra-Cell Ultrasonic Processor (Sonics and Materials, Inc.) standard probe at 30% amplitude for 5 minutes. During the sonication process, the dispersion was stirred magnetically and cooled in a water bath. The white dispersion was transferred to a 100 ml round bottomed flask containing 2,2'-azobis(2-methylpropionamidine)dihydrochloride (0.03 g, 0.1 mmol) and was deoxygenated by nitrogen sparging. The whole flask was immersed in an oil bath with a temperature setting of 70° C., while a deoxygenated mixture of butyl acrylate (1.27 g, 9.9 mmol), methyl methacrylate (2.97 g, 29.7 mmol) and methacrylic acid (0.42 g, 4.9 mmol) was fed into the flask at 0.93 g/hr over 5 hrs. After monomer addition was complete, the heating was continued for another 12 hrs after which time polymerization was found to be complete. The final latex was white and stable, containing particles about 515 nm in diameter (HPPS, Malvern Instruments Ltd). The latex had solids of 22.2% and formed a white and glossy film after drying. Transmission electron microscopy showed that the latex contained polymer encapsulated TiO$_2$ particles.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The claims defining the invention are as follows:

1. A method of preparing a dispersion of polymer encapsulated solid particulate material in a hydrophilic liquid, said method comprising:
   (a) providing a dispersion of solid particulate material in a continuous hydrophilic liquid phase, the dispersion having been prepared from a composition comprising the solid particulate material, a hydrophilic RAFT agent and the continuous hydrophilic liquid phase, wherein the hydrophilic RAFT agent (i) functions as a stabilizer for the solid particular material, and (ii) is not capable of forming micelles within the continuous hydrophilic liquid phase,
   (b) thereafter adding to the dispersion one or more ethylenically unsaturated monomers; and
   (c) polymerising said one or more ethylenically unsaturated monomers under the control of said hydrophilic RAFT agent to form polymer at the surface of said solid particulate material, thereby providing said dispersion of polymer encapsulated solid particulate material in a hydrophilic liquid.

2. The method according to claim 1, wherein the continuous hydrophilic liquid phase is a continuous aqueous phase and the method provides an aqueous dispersion of polymer encapsulated solid particulate material.

3. The method according to claim 1, wherein the solid particulate material is selected from inorganic pigments, organic pigments, magnetic material, waxes, bioactive agents, and combinations thereof.

4. The method according to claim 1, wherein the largest dimension of the solid particulate material is no greater than 10 microns.

5. The method according to claim 1, wherein the largest dimension of the solid particulate material is no greater than 1 micron.

6. The method according to claim 1, wherein the hydrophilic RAFT agent is of general formula (4):

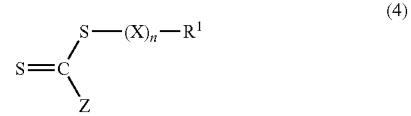

(4)

where each X is independently a polymerised residue of a hydrophilic ethylenically unsaturated monomer, n is an integer ranging from 0 to 100, $R^1$ is an organic group optionally substituted with one or more hydrophilic groups and Z is any group that can promote sufficient reactivity of the thiocarbonyl group towards radical addition while not slowing the rate of fragmentation to the extent that there is unacceptable retardation of polymerisation. ion.

7. The method according to claim 1, wherein the solid particulate material is an inorganic or organic pigment selected from titanium dioxide, zinc oxide, calcium carbonate, iron oxide, silicon dioxide, barium sulphate, carbon black, phthalocyanine blue, phthalocyanine green, quiancridone, dibromananthrone, and combinations thereof.

8. The method according to claim 6, wherein Z is selected from optionally substituted alkoxy, optionally substituted aryloxy, optionally substituted alkyl, optionally substituted aryl, optionally substituted heterocyclyl, optionally substituted arylalkyl, optionally substituted alkylthio, optionally substituted arylalkylthio, dialkoxy- or diaryloxy- phosphinyl [—P(=O)O$R^2_2$], dialkyl- or diaryl- phosphinyl [—P(=O)$R^2_2$], optionally substituted acylamino, optionally substituted acylimino, optionally substituted amino, $R^1-(X)_n-S-$ and a polymer chain, where $R^1$, X and n are as defined in claim 6 and $R^2$ is selected from the group consisting of optionally substituted $C_1$-$C_8$ alkyl, optionally substituted $C_2$-$C_8$ alkenyl, optionally substituted aryl, optionally substituted heterocyclyl, optionally substituted aralkyl, optionally substituted alkaryl.

* * * * *